US012774942B2

(12) United States Patent
Mamier et al.

(10) Patent No.: US 12,774,942 B2
(45) Date of Patent: Oct. 27, 2026

(54) GASSING DEVICE

(71) Applicant: Torensteeg Holding AG, Bern (CH)

(72) Inventors: Marc Mamier, Wyhl (DE); Oliver Wisser, Waldkirch (DE)

(73) Assignee: Torensteeg Holding AG, Bern (CH)

( * ) Notice: Subject to any disclaimer, the term of this patent is extended or adjusted under 35 U.S.C. 154(b) by 224 days.

(21) Appl. No.: 18/713,000

(22) PCT Filed: Nov. 23, 2022

(86) PCT No.: PCT/EP2022/083042
§ 371 (c)(1),
(2) Date: May 23, 2024

(87) PCT Pub. No.: WO2023/094485
PCT Pub. Date: Jun. 1, 2023

(65) Prior Publication Data

US 2025/0027851 A1 Jan. 23, 2025

(30) Foreign Application Priority Data

Nov. 23, 2021 (DE) ............................ 102021130709

(51) Int. Cl.
*G01N 1/28* (2006.01)
*B01F 23/23* (2022.01)
*B01F 23/232* (2022.01)

(52) U.S. Cl.
CPC ............. *G01N 1/28* (2013.01); *B01F 23/232* (2022.01)

(58) Field of Classification Search
CPC ................................ G01N 1/28; B01F 23/232
See application file for complete search history.

(56) References Cited

U.S. PATENT DOCUMENTS 9,476,809 B2 * 10/2016 Krebs ................... B01F 25/314

FOREIGN PATENT DOCUMENTS

DE 202007002538 U1 7/2007
DE 102006040562 A1 * 3/2008 ............ C12M 23/50
DE 102009016364 A1 10/2010
DE 102009039668 A1 3/2011
DE 102011118958 A1 5/2013
DE 102013109450 A1 3/2015
DE 102018131184 A1 6/2020

OTHER PUBLICATIONS

European Patent Office, PCT International Search Report and Written Opinion, Application No. PCT/EP2022/083042, dated Mar. 23, 2023, 25 pages.

* cited by examiner

*Primary Examiner* — Robert A Hopkins
(74) *Attorney, Agent, or Firm* — Mahamedi IP Law LLP

(57) ABSTRACT

The disclosure relates to a gassing device having a fluid discharge unit, a flow control unit, a filter unit, and an exposition head unit, wherein the units are in fluid communication without any hose connections.

12 Claims, 17 Drawing Sheets

GASSING DEVICE

TECHNICAL FIELD

The present invention relates generally to gassing devices for exposing samples to a fluid.

BACKGROUND

Gassing devices, sometimes also referred to as exposure devices can be used to expose samples to fluids in order to investigate possible effects of the fluid on the samples. Possible samples include cell cultures, bacterial cultures, chemical substances and biological samples. Fluids used include, for example, gas, gas mixtures, airborne substances/mixtures, smoke (e.g. from smoking products), environmental pollutants, medical substances, exhaust gases and aerosols. Possible fluids will be summarised below as test fluid E.

Gassing devices comprise various components that are connected to each other via fluid lines. For cleaning, maintenance or if one component is to be replaced by another, it is sometimes necessary to interrupt or re-establish fluid connections. This is time-consuming. Additional effort is required to clean the fluid connections. Furthermore, individual components are difficult to handle due to their size and/or weight.

OBJECT OF THE INVENTION

The object of the present invention is to eliminate one or more of the above-mentioned disadvantages of known gassing devices.

BRIEF DESCRIPTION OF THE INVENTION

The present invention provides subject matters according to the independent claim. Embodiments and variants thereof are stated in the dependent patent claims.

There is provided a gassing device comprising:

- a fluid discharge unit having at least one inlet arranged at a first connecting surface, and an output-side port,
- a flow control unit comprising at least one inlet arranged at a first connecting surface of the flow control unit, and at least one outlet arranged at a second connecting surface of the flow control unit, and comprising a fluid flow device capable of defining a fluid flow between inlet and outlet that is arranged between each one of the at least one inlet at the first connecting surface of the flow control unit and a corresponding one of the at least one outlet at the second connecting surface of the flow control unit,
- an exposition head unit comprising gassing fluid inlets and gassing fluid discharge outlets that are each in fluid communication with each other, and
- gassing fluid feedthroughs each provided between an inlet arranged at a first connecting surface of the exposition head unit and an outlet arranged at a second connecting surface of the exposition head unit, wherein the inlets at the first connecting surface of the exposition head unit are each associated with one of the gassing fluid outlets, wherein

- the units are arranged in operative connection such that the inlets at the first connecting surfaces and the outlets at the second connecting surfaces of two units arranged adjacent to each other are in fluid communication without using any further components.

The output-side port of the fluid discharge unit may be adapted for connecting with a negative pressure source.

In addition or in the alternative, the output-side port of the fluid discharge unit may be adapted for connecting with a fluid sink.

A fluid sink may be considered as the downstream counterpart of an upstream fluid source, in particular for gassing fluid. As explained further below, a fluid source can be used to supply gassing fluid to the gassing device. A fluid sink can be used to receive fluid that is removed from the gassing device.

In particular, gassing fluid that was not used up in the gassing device, and/or other substances, in particular unwanted substances, can be removed from the gassing device.

Such a fluid sink can be provided downstream of the output-side port of the fluid discharge unit. A fluid sink can e.g. be a vent, a receptacle or another device adapted to receive gaseous and/or liquid fluids. The environment can also be used as a fluid sink.

The fluid flow device of the flow control unit may comprise at least one critical nozzle and/or at least one vacuum nozzle.

The gassing device may comprise a filter unit comprising at least one inlet arranged at a first connecting surface of the filter unit, and at least one outlet arranged at a second connecting surface of the filter unit, and one filter each arranged between the at least one inlet and the at least one outlet.

In variants with filter unit, it is also provided that the units are arranged in operative connection with each other such that the respective at least one inlet at the first connecting surfaces and the respective at least one outlet at the second connecting surfaces of two units arranged adjacent to each other are in fluid communication.

The fluid discharge unit, the flow control unit and the exposition head unit can be arranged in that order.

In variants with filter unit, the filter unit can be arranged between the flow control unit and the exposition head unit.

The gassing device may comprise a sample container unit receiving unit. The sample container unit receiving unit is provided for arranging a sample container unit comprising at least one sample container.

The sample container unit receiving unit and the exposition head unit can be arranged in operative connection such that the at least one gassing fluid discharge outlet and the corresponding associated at least one inlet at the first connecting surface of the exposition head unit, and the at least one sample container of a sample container unit received by the sample container unit receiving unit are in fluid communication without using any further components.

The gassing device may comprise a sample container unit receiving unit positioning device.

The sample container unit receiving unit positioning device may be adapted to position the sample container unit receiving unit in a position in which the sample container unit receiving unit and the exposition head unit are in operative connection, and in a position that permits access to a sample container unit received by the sample container unit receiving unit.

Variants are contemplated in which the sample container unit receiving unit positioning device is able to transfer the sample container unit receiving unit from the first position into an intermediate position, wherein the sample container unit receiving unit is moved in a first direction, and the sample container unit receiving unit positioning device is able to transfer the sample container unit receiving unit from the intermediate position into the second position, wherein the sample container unit receiving unit is moved in a second direction.

The first direction and second direction may be different; preferably they may be perpendicular to each other.

The sample container unit receiving unit positioning device may be at least partly automated and/or comprise a controlled actuation device for positioning and/or moving the sample container unit receiving unit in at least partly automated fashion. Electric motors, actuators (e.g. hydraulic and/or pneumatic actuators), toothed belts, cogs, traction ropes etc. can be used as actuation devices.

The gassing device may comprise a first gassing fluid supply unit.

The first gassing fluid supply unit may comprise at least one gassing fluid outlet on a first side, and at least one gassing fluid supply port on a second side.

In such variants, the at least one gassing fluid outlet of the first gassing fluid supply unit can be associated with the at least one gassing fluid inlet of the exposition head unit arranged on a first side of the exposition head unit.

The first gassing fluid supply unit may comprise at least one gassing fluid inlet on the first side.

In variants in which the exposition head unit comprises at least one gassing fluid outlet on the first side, the at least one gassing fluid inlet of the first gassing fluid supply unit may be associated with the at least one gassing fluid outlet on the first side of the exposition head unit.

The at least one gassing fluid outlet of the first gassing fluid supply unit may be a first gassing fluid outlet of the first gassing fluid supply unit that is in fluid communication with the gassing fluid supply port of the first gassing fluid supply unit. In at least one case, a further gassing fluid outlet and an adjacent gassing fluid inlet of the first gassing fluid supply unit may be in fluid communication via a gassing fluid guideway formed in the first gassing fluid supply unit.

The gassing device may comprise a second gassing fluid supply unit.

The first and second gassing fluid supply units may e.g. be arranged on opposite sides of the exposition head unit.

The second gassing fluid supply unit may comprise at least one gassing fluid outlet on a first side, and a gassing fluid discharge port on a second side.

In such variants, the at least one gassing fluid outlet of the second gassing fluid supply unit can be associated with the at least one gassing fluid inlet of the exposition head unit arranged on a second side of the exposition head unit.

The second gassing fluid supply unit may comprise at least one gassing fluid inlet on the first side.

In variants in which the exposition head unit comprises at least one gassing fluid outlet on the second side, the at least one gassing fluid inlet of the second gassing fluid supply unit may be associated with the at least one gassing fluid outlet on the second side of the exposition head unit.

The at least one gassing fluid outlet of the second gassing fluid supply unit may be a first gassing fluid outlet of the second gassing fluid supply unit that is in fluid communication with the gassing fluid discharge port of the second gassing fluid supply unit. In at least one case, a further gassing fluid outlet and an adjacent gassing fluid inlet of the second gassing fluid supply unit may be in fluid communication via a gassing fluid guideway formed in the second gassing fluid supply unit.

The gassing device may comprise a first gassing fluid supply unit positioning device for the first gassing fluid supply unit.

The first gassing fluid supply unit positioning device may be adapted to position the first gassing fluid supply unit in a first position in which the first gassing fluid supply unit and the exposition head unit are spaced away from one another, and in a second position in which the first gassing fluid supply unit and the exposition head unit are in operative connection.

The first gassing fluid supply unit positioning device comprises at least one controlled actuation device.

The actuation device may comprise one or more electric motors, actuators (e.g. hydraulic and/or pneumatic actuators), toothed belts, cogs, traction ropes etc.

The gassing device may comprise a second gassing fluid supply unit positioning device for the second gassing fluid supply unit.

The second gassing fluid supply unit positioning device may be adapted to position the second gassing fluid supply unit in a first position in which the second gassing fluid supply unit and the exposition head unit are spaced away from one another, and in a second position in which the second gassing fluid supply unit and the exposition head unit are in operative connection.

The second gassing fluid supply unit positioning device comprises at least one controlled actuation device.

The actuation device may comprise one or more electric motors, actuators (e.g. hydraulic and/or pneumatic actuators), toothed belts, cogs, traction ropes etc.

The gassing device may comprise a mounting system.

The exposition head unit may be releasably mounted on the mounting system.

In further variants, the fluid discharge units and the flow control unit and, if present, the filter unit, may be releasably mounted on the exposition head unit instead of the mounting system.

Furthermore, at least one of the above-mentioned positioning devices can be mounted on the mounting system.

A sealing mat with openings can be arranged between at least two of the units.

A gassing device according to the invention can be freely scalable. This is understood to mean that any number of samples can be exposed to gassing fluid at the same time. Gassing devices are contemplated in which 1, 2, 3, 4, . . . , 12, . . . , 24, . . . , 48, . . . 96, . . . samples can be exposed to gassing fluid at the same time.

The number of sample containers, inlets and outlets, and openings and guideways etc. of the different units may depend on the number of samples that can be simultaneously exposed to gassing fluid.

Variants are contemplated in which there is one sample container for each sample to be simultaneously exposed to gassing fluid, and based on this, a corresponding number of inlets and outlets, and openings and guideways etc. of the different units.

Variants are also contemplated in which two or more samples are arranged in at least one sample container at the same time.

A "fluid connection" is in particular understood to be a structure closed off to the outside which enables fluid to transit form a first area (or component) to a second area (or component).

A "fluid connection between a first component and a second component" is in particular understood to mean that only said two components are involved in the fluid communication. To illustrate this, the wording "without using further components" is additionally used in some instances.

By contrast, "fluid connection" does not include that fluid is able to transit from a first area to a second area via the environment (e.g. ambient air). This could be the case e.g. when fluid is able to transit from an outlet to an inlet without any further structural component.

BRIEF DESCRIPTION OF THE DRAWINGS

The following description makes reference to the accompanying drawings, in which.

Figure 1:
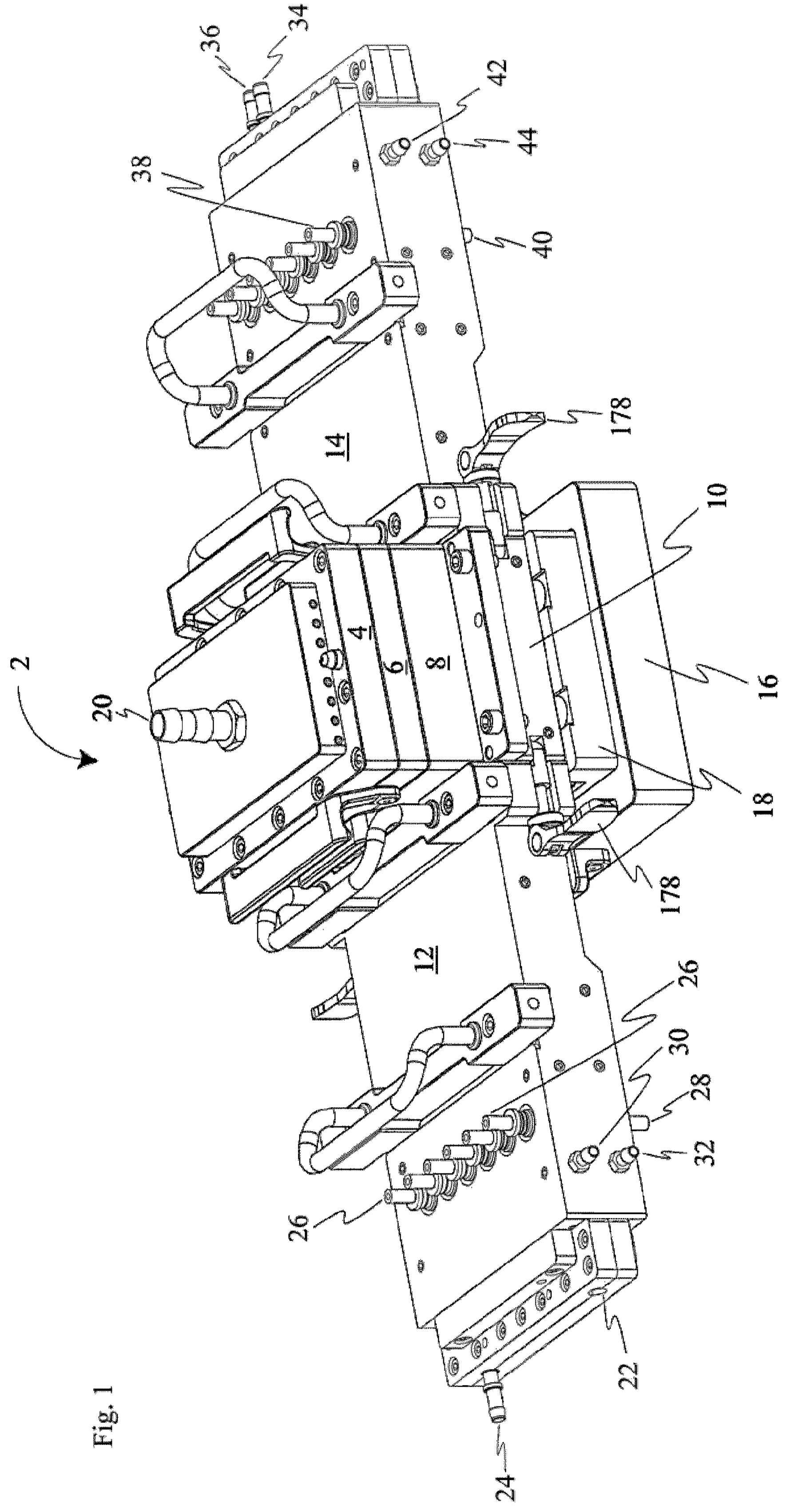
FIG. 1 is a schematic illustration of a gassing device.

The reference numerals are not repeated in all drawings. A reference numeral present in one drawing is also deemed to be present in other drawings even if not shown.

Explanations that apply to one drawing therefore also apply to all other drawings and will not be repeated, unless otherwise indicated.

DETAILED DESCRIPTION

Hereinafter, reference will be made to embodiments in which negative pressure is applied at the input side (in particular the output side of a fluid discharge unit) in order to effect the gassing of samples. In particular, in such embodiments, as explained below, gassing fluid (test fluid and/or reference fluid) provided on the input side (in particular at the inlet of a gassing fluid supply unit) is supplied to gassing devices by means of negative pressure/a vacuum applied at the output side. Graphically speaking, in such embodiments gassing fluid is "aspired".

The explanations in this respect also apply to embodiments in which a reverse operating principle is used, namely in which overpressure is applied on the input side (in particular on the inlet side of a gassing fluid supply unit) in order to effect the gassing of samples. In particular, in such embodiments, as explained below, gassing fluid (test fluid and/or reference fluid) provided on the input side (in particular at the inlet of a gassing fluid supply unit) is supplied to gassing devices by means of negative pressure/a vacuum applied on the output side. Graphically speaking, in such embodiments gassing fluid is "injected".

Gassing fluid means at least one fluid that can be supplied to the gassing device in order to expose one or more samples to gas. A gassing fluid can be a so-called test fluid, the effect of which on a sample is to be determined. Examples of test fluids include e.g. liquid aerosols, gases and gas mixtures, airborne pollutants, smoke, in particular smoke from smoking products, wherein liquid test fluids or mixtures of gaseous and liquid fluids are also possible. A gassing fluid can be a so-called reference fluid, the effect of which on a sample can be compared to the effect that a test fluid has on a similar sample. Examples of reference fluids include e.g. ambient air, synthetic air, oxygen, nitrogen, argon, hydrogen, helium.

Furthermore, reference will be made below to embodiments that can be used to expose a plurality of samples to gassing fluid simultaneously, e.g. 24, 48 or 96 samples. Such embodiments comprise a corresponding number of sample containers, inlets and outlets, and openings and guideways etc. of the different units.

The explanations in this respect also apply to embodiments in which only one, or a small number of samples can simultaneously be exposed to gassing fluid, e.g. 1, 2, 3 . . . . This is because the disclosed gassing device is freely scalable, i.e. at least with respect to the samples that can simultaneously be exposed to gassing fluid.

FIG. 1 schematically illustrates a gassing device 2 having a fluid discharge unit 4, a flow control unit 6, an optional filter unit 8 and an exposition head unit 10.

Figure 3A:
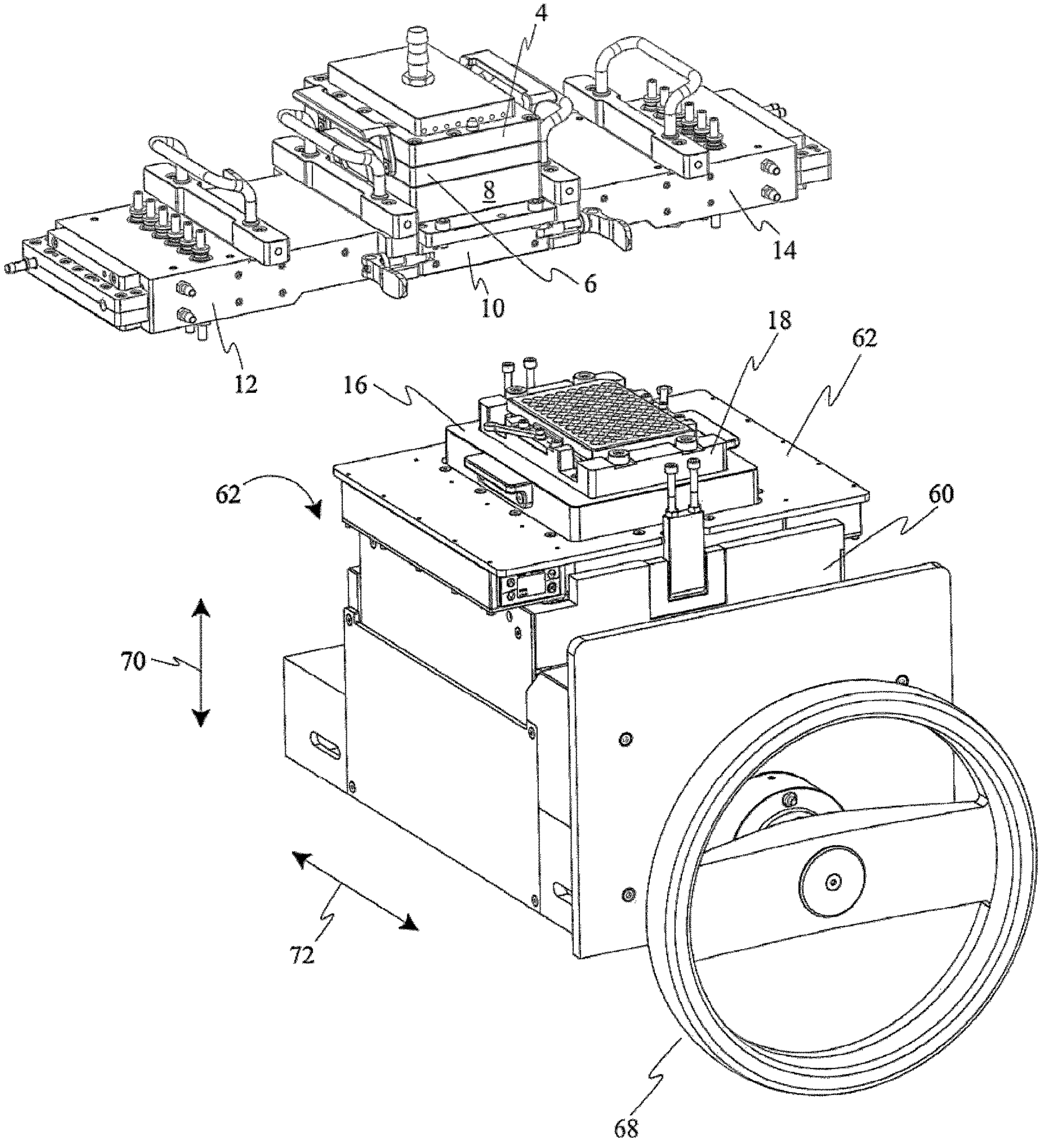
FIGS. 3*a* and 3*b* are schematic illustrations of a gassing device comprising a sample container unit receiving unit positioning device (FIG. 3*a*) in a position in which a sample container unit receiving unit and an exposition head unit are in operative connection, and (FIG. 3*b*) in a position that permits access to a sample container unit.
Figure 3B:
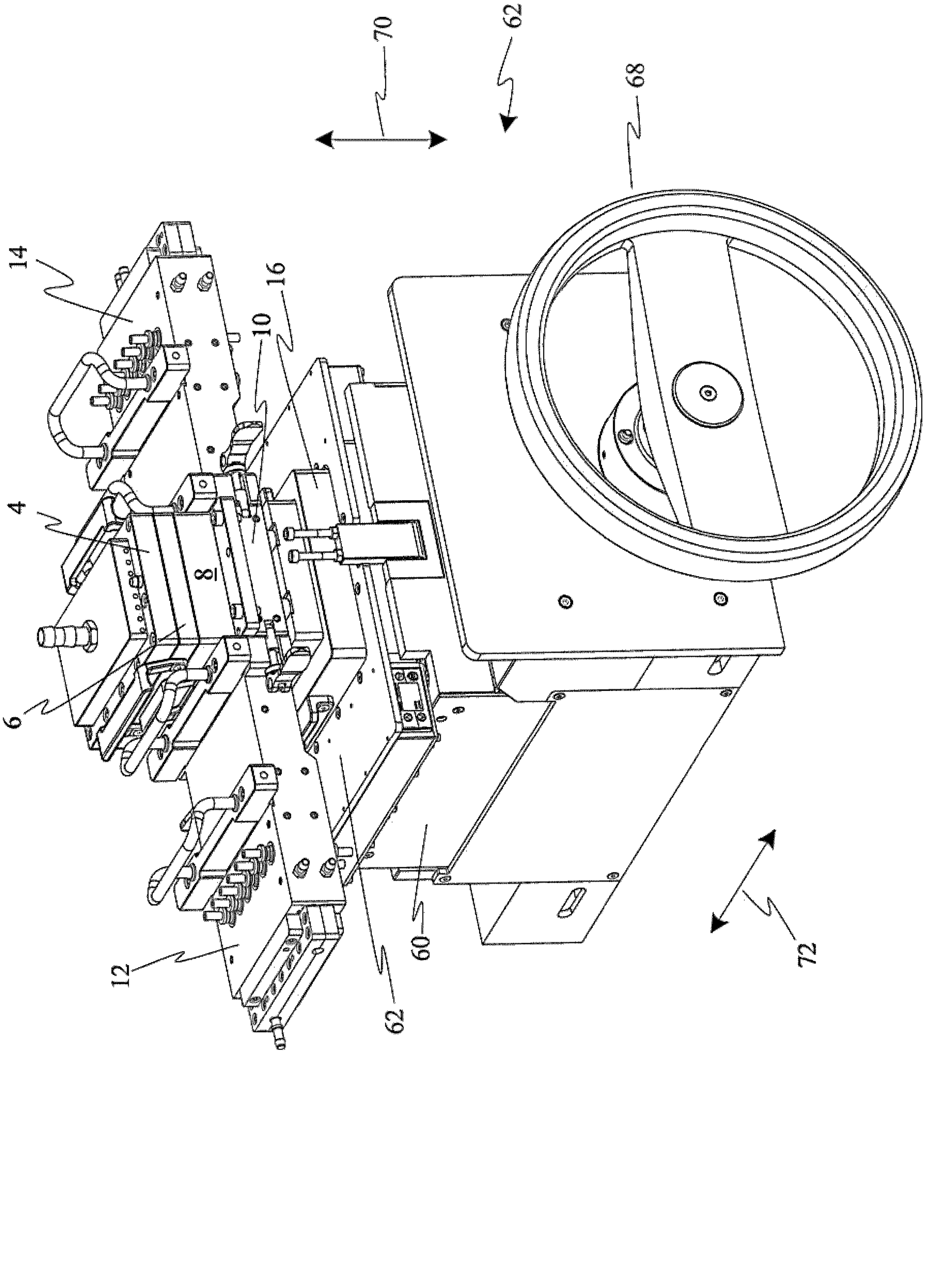

Furthermore, there is a first gassing fluid supply unit 12, and a second gassing fluid supply unit 14, and a sample container unit receiving unit 16 with a sample container unit 18 held in it (see e.g. FIG. 3*b*).

The fluid discharge unit 4, the flow control unit 6, the optional filter unit 8 and the exposition head unit 10, the first gassing fluid supply unit 12 and the second gassing fluid supply unit 14 and the sample container unit receiving unit 16 with the sample container unit 18 are components of the gassing device 2 which is "directly" involved in a gassing operation, as it were.

The first gassing fluid supply unit 12 and the second gassing fluid supply unit 14 optionally supply gassing fluid provided for gassing samples together with what is known as dilution fluid (annotation: hereinafter, the term gassing fluid, unless otherwise indicated, shall comprise both pure gassing fluid and gassing fluid diluted with dilution fluid).

Figure 2:
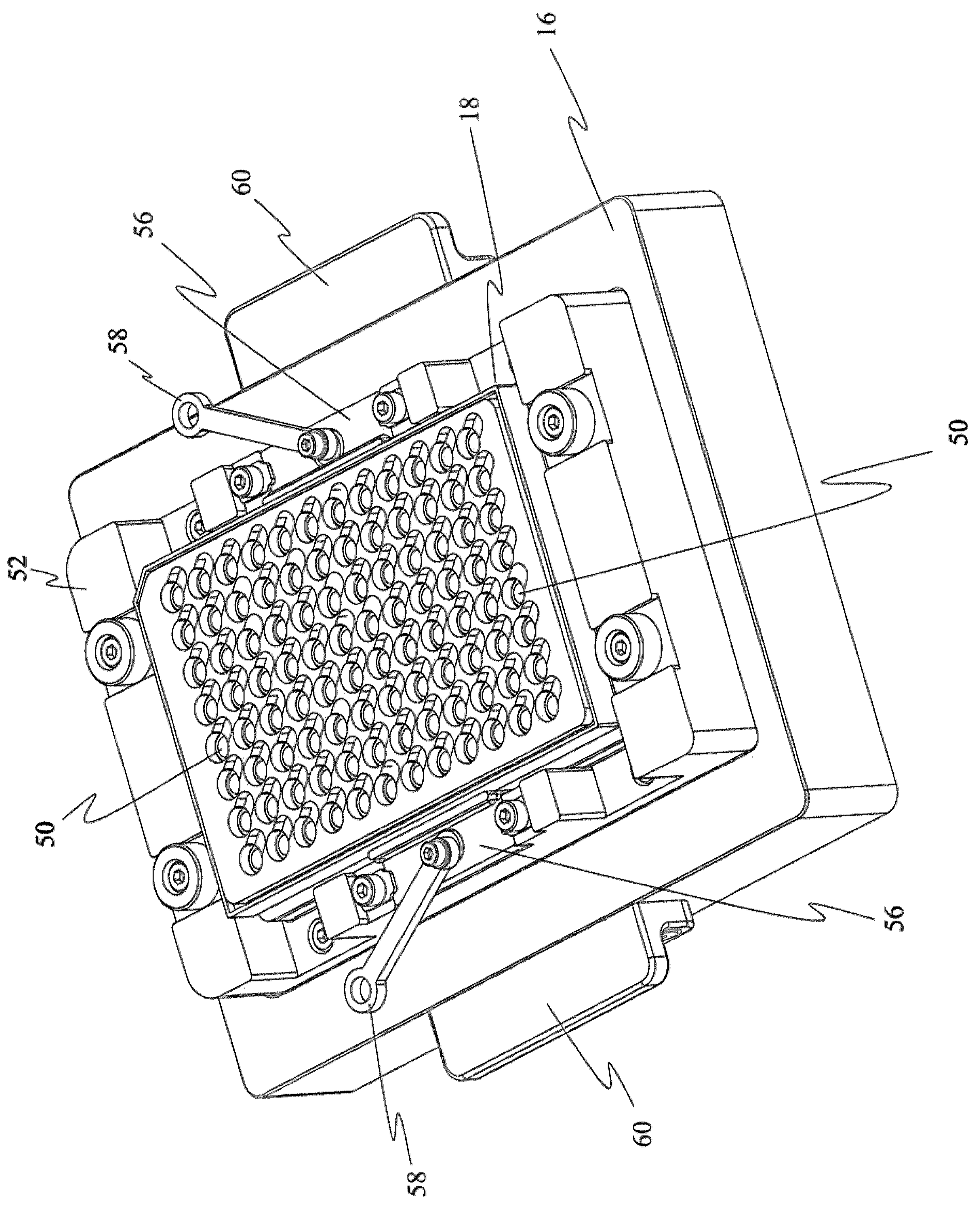
FIG. 2 is a schematic illustration of a sample container unit receiving unit with a sample container unit containing sample containers.

The samples are located in the sample container unit 18 (more precisely, in the sample containers 50; see e.g. FIG. 2). Gassing fluid is supplied to the samples in the sample container unit 18 via the exposition head unit 10.

In embodiments operating with negative pressure, the supply of gassing fluid is achieved by transporting gassing fluid into the gassing fluid supply units 12 and 14 by means of negative pressure applied to the output side of the fluid discharge unit 4—as described in more detail below—and from there via the exposition head unit 10 to the samples.

As a result of the negative pressure, gassing fluid may be carried back from the samples through the exposition head unit in the direction of the flow control unit 6 and the fluid discharge unit 4, and through them. To prevent undesired components from getting into the flow control unit 6 or the fluid discharge unit 4, the optional filter unit 8 can be employed.

In embodiments working with overpressure, the supply of gassing fluid is achieved by transporting gassing fluid into the gassing fluid supply units 12 and 14 by means of overpressure applied to the output side of at least one gassing fluid supply unit 12, and from there via the exposition head unit 10 to the samples.

As a result of the overpressure, gassing fluid may be carried back from the samples through the exposition head unit in the direction of the flow control unit 6 and the fluid discharge unit 4, and through them. To prevent undesired components from getting into the flow control unit 6 or the fluid discharge unit 4, the optional filter unit 8 can be employed.

The fluid connections between the units are provided without using any further components, except from sealing elements, if required. This is important in particular when a large number of samples (e.g. 96 and more) is present in the sample container unit 18, and each sample is exposed separately to gassing fluid.

For each sample, fluid connections are required between one of the gassing fluid supply units 12 and the exposition head unit 10, between the exposition head unit 10 and the filter unit 8, between the filter unit 8 and the flow control unit 6, and between the flow control unit 6 and the fluid discharge unit 4. Thus, four (4) fluid connections (without the filter unit 8: three (3) fluid connections) are required per sample.

This e.g. adds up to a total of 386 (or 290) fluid connections for 96 samples. In the approach disclosed here, these are provided by said units themselves. For illustration purposes, if only one further component (e.g. a hose) were needed per fluid connection, then 391 (or 295) components would be necessary in the case of 96 samples, while the approach disclosed here only requires 8 components (i.e. the units 4, 6, **8*a*/8*a*, 10, 12, 14, 16, 18**).

There are further fluid connections for supplying gassing fluid and applying negative pressure or overpressure, and, as will be explained below, optionally for supplying reference fluid and tempering fluid. Such fluid connections can be referred to as "external" fluid connections in relation to the components 2-18 (see above) that are "directly" involved in the gassing operation. The number of such "external" fluid connections is comparably minimal, as will be appreciated below.

The fluid discharge unit 4 has an output-side port 20. The port 20 is provided for connection to what is known as a fluid sink. In contrast to a fluid source that provides gassing fluid to be supplied to the gassing device, a fluid sink is provided to receive fluid that is removed from the gassing device.

Via the port 20, gassing fluid that is not used up in the gassing device can be removed from the gassing device. Via the port 20, furthermore, substances resulting from, or being released etc. in the process of gassing samples in the gassing device can be removed. These can e.g. be substances that are released from samples to be gassed due to interactions with the gassing fluid etc. Such substances can be entrained to the port 20 by the gassing fluid that is carried from the samples downstream to the port 20.

A fluid sink can be provided downstream of the port 20. A fluid sink can e.g. be a vent, a receptacle or another device adapted to receive gaseous and/or liquid fluids. It is also contemplated that the environment can be used as a fluid sink, if the fluid removed from the gassing device is a non-toxic, safe substance that is not hazardous to health. In such cases, it is the environment that receives fluid removed from the gassing device.

In embodiments operating with negative pressure, the output-side port 20 is configured as port for a negative pressure source. The negative pressure source can also provide the function of a fluid sink that is able to receive fluid removed from the gassing device via the fluid discharge unit 4. In further variants, a negative pressure source and a fluid sink can be provided as separate components.

In embodiments operating with overpressure, the output-side port 20 is configured as port for a fluid sink. The negative pressure source can also provide the function of a fluid sink that is able to receive fluid removed from the gassing device via the fluid discharge unit 4. In further variants, a negative pressure source and a fluid sink can be provided as separate components.

At the output-side port 20 of the fluid discharge unit 4, the fluid connection to the "outside" to a negative pressure source or a fluid sink can e.g. be established by means of a hose or tube.

The first gassing fluid supply unit 12 includes a test fluid supply port 22, via which test fluid (e.g. smoke, noxious gas) can be supplied, and a reference fluid supply port 24, via which a reference fluid (e.g. unpolluted ambient air) can be supplied. The fluid connections to a test fluid source on the "outside" and to a reference fluid source can e.g. be established by means of hoses or tubes.

Furthermore, the first gassing fluid supply unit 12 may comprise inputs 26 and outputs 28 by means of which a dilution fluid can be supplied to the test fluid and/or the reference fluid. The fluid connections to the "outside" between the inputs 26 and outputs 28 and sources or sinks for dilution fluid can e.g. each be established via a hose or a tube. According to the drawings showing six inputs 26 and six outputs 28, these would be twelve fluid connections.

The first gassing fluid supply unit 12 may comprise a tempering fluid inlet 30 and a tempering fluid outlet 32, through which fluid can be supplied for cooling or heating the first gassing fluid supply unit 12 and in particular test fluid (or optionally reference fluid) contained in it. The fluid connections to a tempering fluid source or sink on the "outside" can e.g. be established by means of hoses or tubes.

The second gassing fluid supply unit 14 includes a test fluid discharge port 34, via which test fluid can be discharged, and may include a reference fluid discharge port 36, via which a reference fluid can be discharged (e.g. unpolluted ambient air). The fluid connections to the "outside" to a test fluid source and a reference fluid source can e.g. be established by means of hoses or tubes.

Furthermore, the second gassing fluid supply unit 12 may comprise inputs 38 and outputs 40 by means of which a dilution fluid can be supplied to the test fluid and/or the reference fluid. The fluid connections to the "outside" between the inputs 38 and outputs 40 and sources or sinks for dilution fluid can each be e.g. established via a hose or a tube. According to the drawings showing six inputs 38 and six outputs 40, these would be twelve fluid connections.

The second gassing fluid supply unit 12 may comprise a tempering fluid inlet 42 and a tempering fluid outlet 44, through which fluid can be supplied for cooling or heating the second gassing fluid supply unit 14 and in particular test fluid (or optionally reference fluid) contained in it. The fluid connections to a tempering fluid source or sink on the "outside" can e.g. be established by means of hoses or tubes.

The exposition head unit 10 may comprise at least one tempering fluid inlet 46 and at least one tempering fluid outlet 48 (see e.g. FIG. 4) through which fluid for cooling or heating the exposition head unit 10, and in particular fluid contained in it, can be supplied. According to the drawings, two tempering fluid inlets 46 and two tempering fluid outlets 48 are provided (see e.g. FIG. 4). The fluid connections to a tempering fluid source or sink on the "outside" can e.g. be established by means of hoses or tubes.

Based on this, there are 28 fluid connections to the "outside". The number of separate additional components to be used for this is acceptable.

The fluid discharge unit 4, the flow control unit 6, the filter unit 8 and the exposition head unit 10 permit a modular structure in which the units can be directly connected to each other by simply arranging the units on top of one another as shown in the illustration. If, for example, after a gassing operation, the modular structure is to be broken up, e.g. in order to replace gassed samples with ungassed samples, for cleaning and/or for replacing one or more units, the affected units can be separated from each other again. To facilitate handling, handles or the likes are provided.

This also applies to the gassing fluid supply units 12 and 14 that can be directly connected to the exposition head unit 10 for performing the gassing, and can be removed from it upon completion of the gassing operation.

FIG. 2 is a schematic illustration of a sample container unit receiving unit 16 with a sample container unit 18 containing sample containers 50 that is arranged in it. The sample containers 50 may e.g. be wells.

According to the illustration, ninety-six (96) sample containers 50 are provided. This number of sample containers 50 is exemplary only; the number of sample containers 50, or of a corresponding sample container unit 18 can basically be chosen at will, for example from one sample container up to several hundred.

The sample container unit 18 is held by means of a frame 52 that is attached to a base 54 of the sample container unit receiving unit 16 e.g. by screws. The sample container unit 18 may be positioned or secured in the frame 52 by means of a clamping mechanism. According to the illustration, the mechanism comprises two movable jaws 56 that can be shifted by levers 58 such that the sample container unit 18 can be inserted, positioned, secured and removed again.

For handling, the sample container unit receiving unit 16 includes handles 60. These can e.g. be used to handle the sample container unit receiving unit 16 when it is supposed to be arranged at or removed from the exposition head unit 10.

The sample container unit receiving unit 16 may be releasably connected to the exposition head unit 10. Clamps, plug-in, click-on, and/or snap-fit connections, screws etc. may be used for this.

The handling of the sample container unit receiving unit 16 may be supported by a sample container unit receiving unit positioning device 62 (see in particular FIGS. 3*a* and 3*b*). The sample container unit receiving unit positioning device 62 sets up a mounting surface 64 on which the sample container unit receiving unit 16 can be releasably mounted.

The sample container unit receiving unit positioning device 62 includes a base 66 comprising a mechanism for positioning the mounting surface 64 and the sample container unit receiving unit 16 mounted on it in the position shown in FIG. 3*a*, in which the sample container unit receiving unit 16 and the exposition head unit 10 are operatively connected, and in the position shown in FIG. 3*b* that allows access to the sample container unit 18.

In the illustration, the mechanism for positioning the mounting surface 64 and the sample container unit receiving unit 16, respectively, comprises a setting wheel 68. By means of the setting wheel 68 (e.g. by turning the same) the mounting surface 64 can be moved in the direction toward the exposition head unit 10 and in the opposite direction. These directions are indicated by the arrow 70 in FIG. 3*a*.

Furthermore, the mechanism may e.g. comprise guideways or the likes that permit, when the base 66 has been positioned in the position shown in FIG. 3*b*, to move the base 66 in the directions indicated by the arrow 72. The movement options of the mechanism may be compared with the movements of a drawer. In order to move the base in these directions, the setting wheel 68 can be used as a handle.

In further variants, it is provided to actuate the sample container unit receiving unit positioning device 62 at least partly in an automated fashion and/or by means of a controlled actuation device for positioning and/or moving the sample container unit receiving unit in at least partly automated fashion. Electric motors, actuators (e.g. hydraulic and/or pneumatic actuators), toothed belts, cogs, traction ropes etc. can be used as actuation devices.

For example, the function of the setting wheel and/or the function of the mechanism allowing movements in the directions indicated by the arrow 72 may be taken over by at least one controlled actuation device.

Figure 4A:
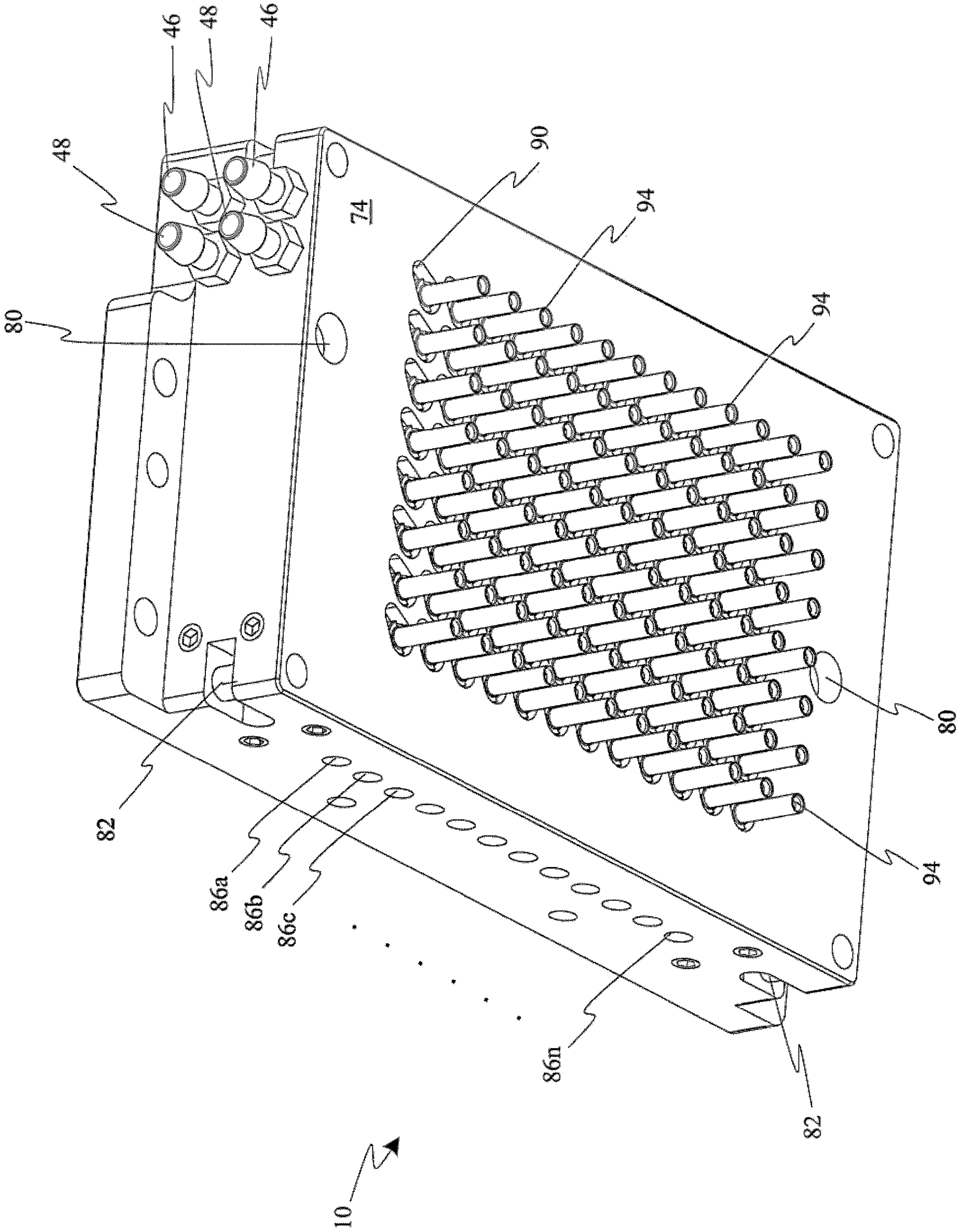
FIG. 4*a* and FIG. 4*b* illustrate an exposition head unit.
Figure 4B:
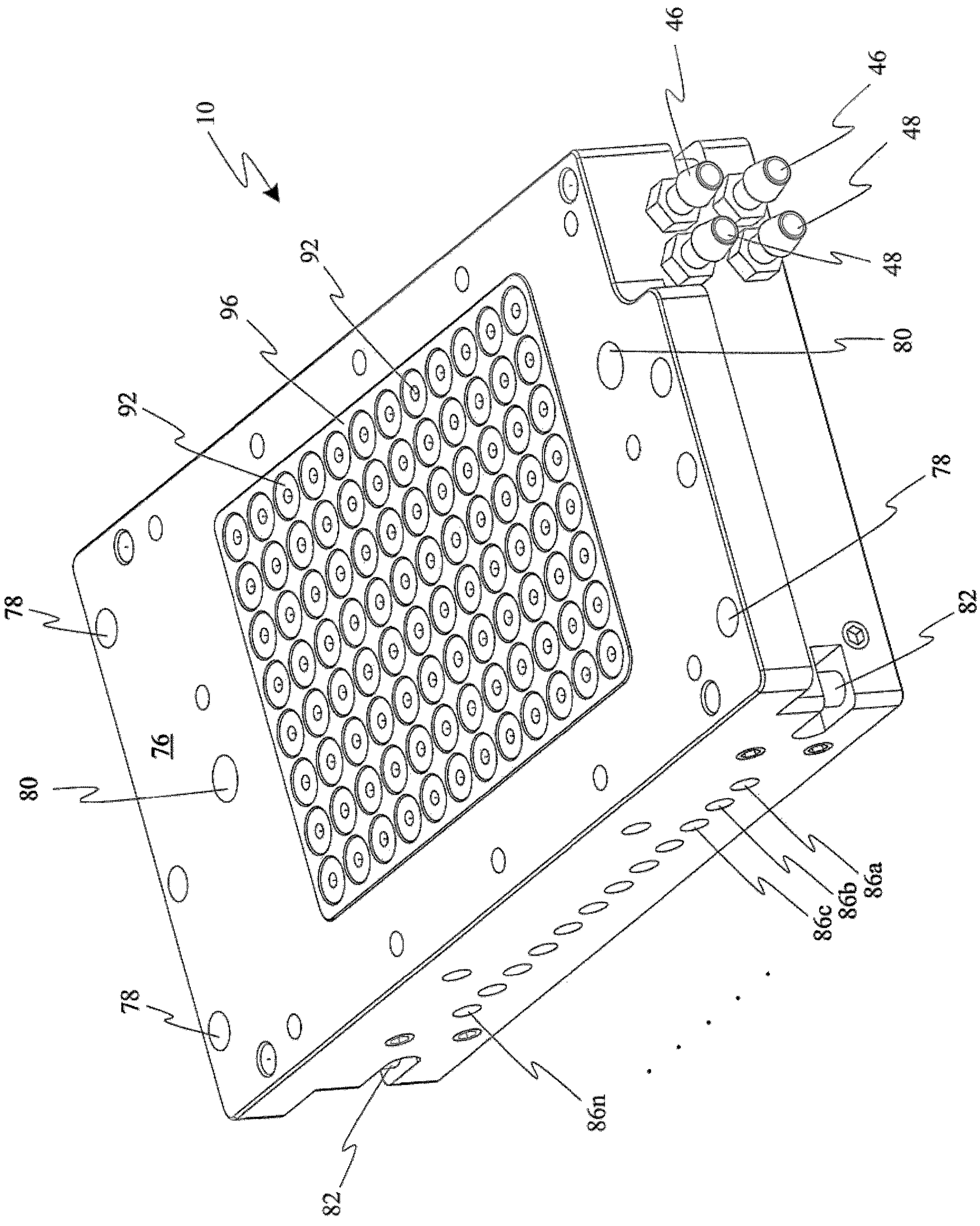

FIGS. 4*a* and 4*b* illustrate an exposition head unit 10. FIG. 4*b* shows a perspective view of a first connecting surface 74, FIG. 4*a* shows a perspective view of a second connecting surface 74.

The exposition head unit 10 includes bores 78 that can be used for connecting with a filter unit 8. This is explained in more detail below. The bores may be provided with internal threads in order to receive an external thread, or may have a smooth interior wall to receive e.g. a bolt or pin.

Furthermore, bores 80 may be present for supporting a general alignment of the exposition head unit 10 relative to the units which in the illustration are arranged above it. For example, a pin projecting beyond the second connecting surface 76 can be arranged in the bores 80. This pin/These pins can be inserted into a corresponding bore in a unit above, which allows at least a general alignment of the units in relation to one another.

The exposition head unit 10 includes connecting structures 82 by means of which the exposition head unit 10 can be connected with another component. In the illustration, these connecting structures 82 each comprise a pin for engagement with a hook or the like.

As already stated above, the exposition head unit 10 comprises two tempering fluid inlets 46 and two tempering fluid outlets 48 through which tempering fluid can be supplied in order to control the temperature of the exposition head unit 10 and the fluid contained in it.

The exposition head unit 10 comprises fluid guideways 84 (see also FIGS. 8 and 9) extending in a plane parallel to the first and second connecting surfaces 74 and 76. The fluid guideways 84 may be configured as through-holes. FIGS. 4*a* and 4*b* show the openings 86*a*, 86*b*, 86,*b*, . . . , 86*n* of the fluid guideways 84.

Embodiments are provided in which all openings of the fluid guideways 84 (e.g. the openings 86*a*, 86*b*, 86,*b*, . . . , 86*n* shown in FIGS. 4*a* and 4*b* on the left) on one side of the exposition head unit 10 act as gassing fluid inlet, and the openings on the opposite side of the exposition head unit 10 act as gassing fluid outlet.

In such embodiments, the gassing fluid can be supplied on one side, and excess gassing fluid (e.g. gassing fluid not used in the exposition head unit 10 in a gassing process) can be discharged on the other side.

In such embodiments, a gassing fluid supply unit (e.g. gassing fluid supply unit 12) can be arranged on one side of the exposition head unit 10 in order to supply test fluid, while the other side of the exposition head unit 10 is connected with a fluid sink.

Furthermore, embodiments are provided in which the openings on one side of the exposition head unit 10 alternately act as gassing fluid inlet or gassing fluid outlet. For example, a first opening 86*a* may be a gassing fluid inlet, the next adjacent opening 86*b* may be a gassing fluid outlet, the next adjacent opening 86*c* may be a gassing fluid inlet etc. Accordingly, the openings on the opposite side of the exposition head unit 10 alternately act as gassing fluid inlet or gassing fluid outlet, such that in one fluid guideway 84 of which one opening acts as gassing fluid inlet on one side of the exposition head unit 10, the other opening acts as gassing fluid outlet on the other side of the exposition head unit 10. In such embodiments, gassing fluid can be meandered through the exposition head unit 10. This can be done such, for example, that gassing fluid is supplied to the opening 86*a*, goes through the corresponding fluid guideway 84 to its other opening and exits there, is then supplied via the adjacent opening of the next fluid guideway 84, goes through the same to reach its other opening 86*b*, exists there, and is then supplied through the adjacent opening 86*c* to the next fluid guideway 84, etc.

In such embodiments, a gassing fluid supply unit (e.g. gassing fluid supply unit 12) can be arranged on one side of the exposition head unit 10, and a further gassing fluid supply unit (e.g. gassing fluid supply unit 12) can be arranged on the other side of the exposition head unit 10. This is explained in more detail below.

Figure 11:
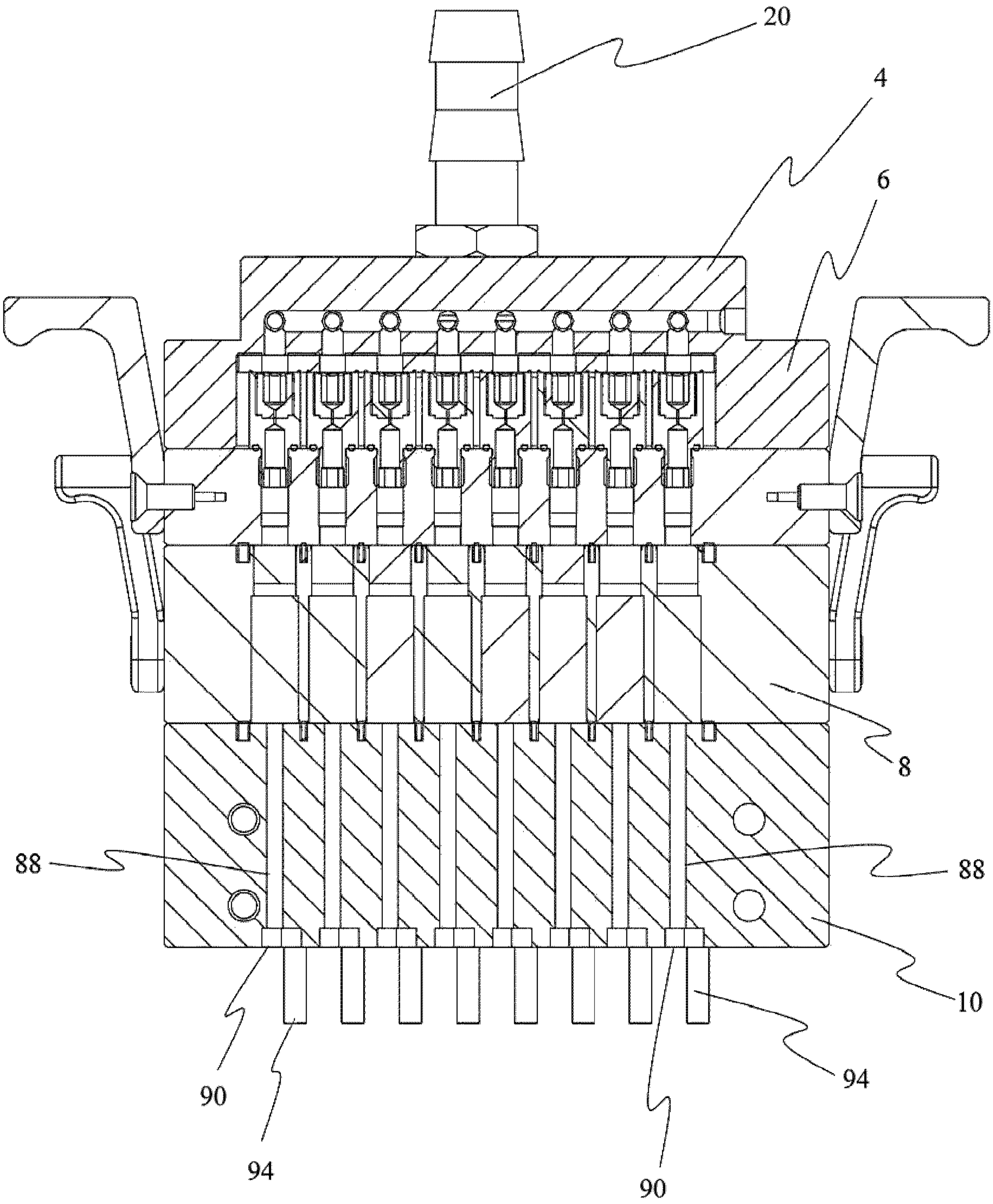
FIG. 11 illustrates a fluid discharge unit, flow control unit, filter unit and exposition head unit arranged in operative connection with each other.

The exposition head unit 10 comprises gassing fluid feedthroughs 88 (see FIG. 11). The gassing fluid feedthroughs 88 extend between the first connecting surface 74 and the second connecting surface 76. The openings 90 of the gassing fluid feedthroughs 88 on the first connecting surface 74 are referred to as inlets. The openings 92 of the gassing fluid feedthroughs 88 on the second connecting surface 76 are referred to as outlets. This is to indicate that when there is negative pressure in a gassing fluid feedthrough 88, fluid can be transported into the corresponding inlet 90 and discharged through the corresponding outlet 92.

Furthermore, the exposition head unit 10 comprises gassing fluid discharge outlets 94 on its first connecting side 74. The gassing fluid discharge outlets 94 are connected with the fluid guideways 84.

In the illustration, the gassing fluid discharge outlets 94 that are arranged in a row in the direction of a fluid guideway 84, are connected with this fluid guideway.

The gassing fluid discharge outlets 94 may be formed as tubes extending away from the first connecting surface 74. This may support the supply of test fluid in a sample container, because the above-mentioned gassing fluid discharge outlets 94 may extend into the sample containers, in the assembled state of exposition head unit 10 and sample container unit receiving unit 16.

The inlets 90 and the gassing fluid discharge outlets 94 are arranged to result in respective pairs of "inlet 90 and gassing fluid discharge outlets 94" which, in the assembled state of exposition head unit 10 and sample container unit receiving unit 16, are each in fluid communication with a sample container.

A sealing mat 96 is provided on its second connecting surface 76. The second connecting surface 76 may comprise a recess in or with which the sealing mat 96 can be positioned. The sealing mat 96 has openings that may be positioned and configured to each form the edge of an outlet 92.

The exposition head unit 10 may include handles that may be helpful in its handling.

Figure 5A:
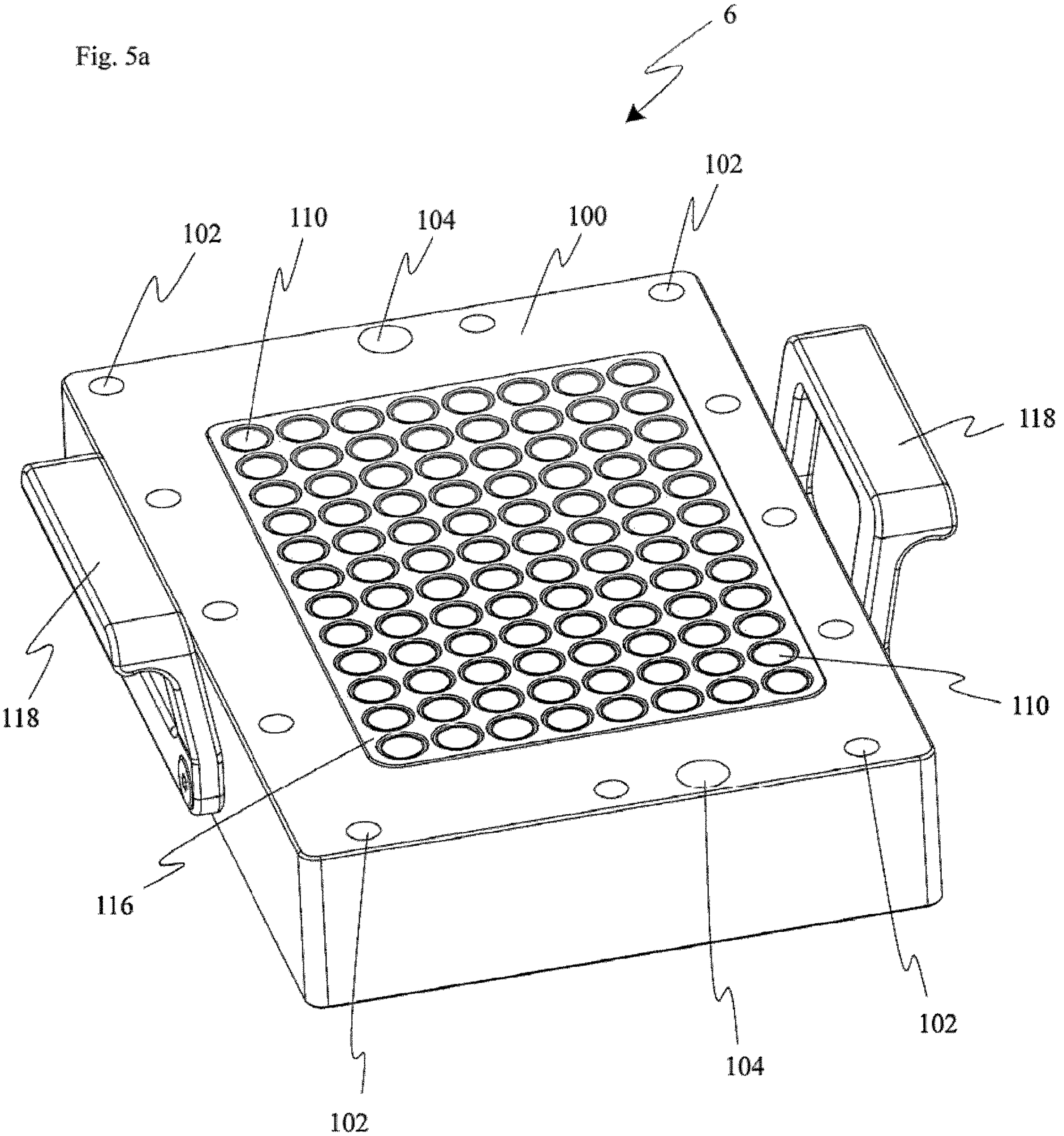
FIGS. 5*a* and 5*b* illustrate a filter unit in perspective view (FIG. 5*a*) and cross-sectional view (FIG. 5*b*).
Figure 5B:
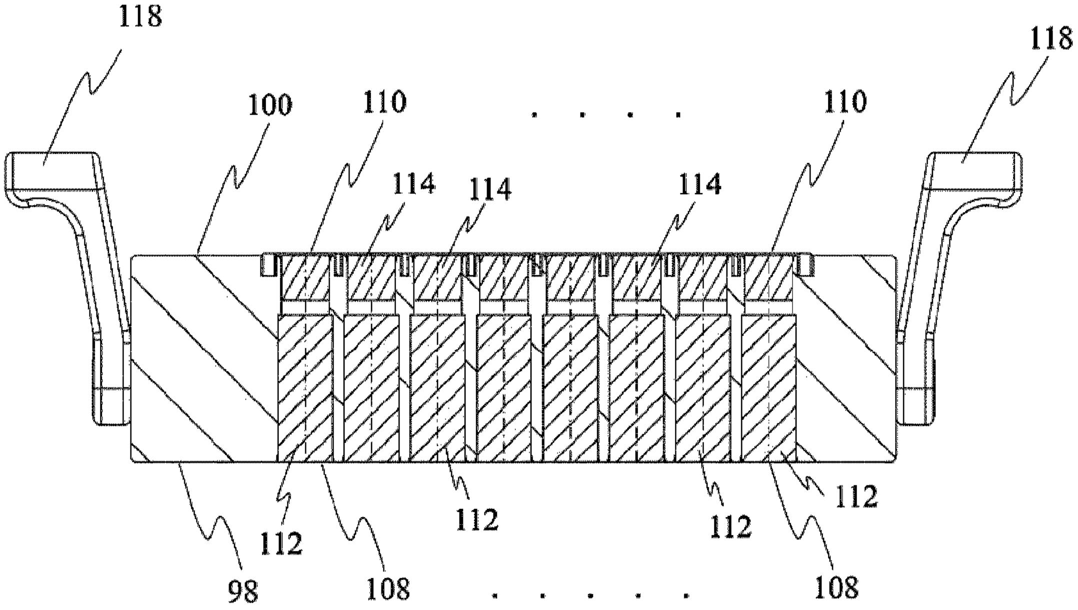

FIGS. 5*a* and 5*b* illustrate a filter unit 8. FIG. 5*a* shows a perspective view, FIG. 5*b* shows a cross-sectional view of the filter unit 8.

The filter unit 8 comprises a first connecting surface 98 and a second connecting surface 100.

The filter unit 8 comprises bores 102 that are used for connecting with other units (e.g. exposition head unit 10 and/or flow control unit 6). The bores 102 may be provided with internal threads in order to receive an external thread, or have a smooth interior wall to receive e.g. a bolt or pin.

Furthermore, bores 104 may be present for supporting a general alignment of the filter unit 8 relative to the units which, in the illustration, are arranged above and/or below it. For example, the bores 104 may serve to receive pins that extend from a unit arranged below in the illustration, which enables an at least general alignment of the units in relation to each other.

The filter unit 8 comprises through-holes 106. The through-holes 106 extend between the first connecting surface 98 and the second connecting surface 100. The openings 108 of the through-holes 106 on the first connecting surface 98 are referred to as inlets. The openings 110 of the through-holes 106 on the second connecting surface 100 are referred to as outlets.

Filters are provided in each of the through-holes 106. In the illustration, two filters are used for each through-hole 106, namely a coarse filter 112 and a fine filter 114.

A sealing mat 116 is provided on its second connecting surface 100. The second connecting surface 100 may comprise a recess with which the sealing mat 116 can be positioned. The sealing mat 116 has openings that may be positioned and configured to each form the edge of an outlet 110.

The filter unit 8 may include handles 118 that may be helpful in its handling.

Figure 6A:
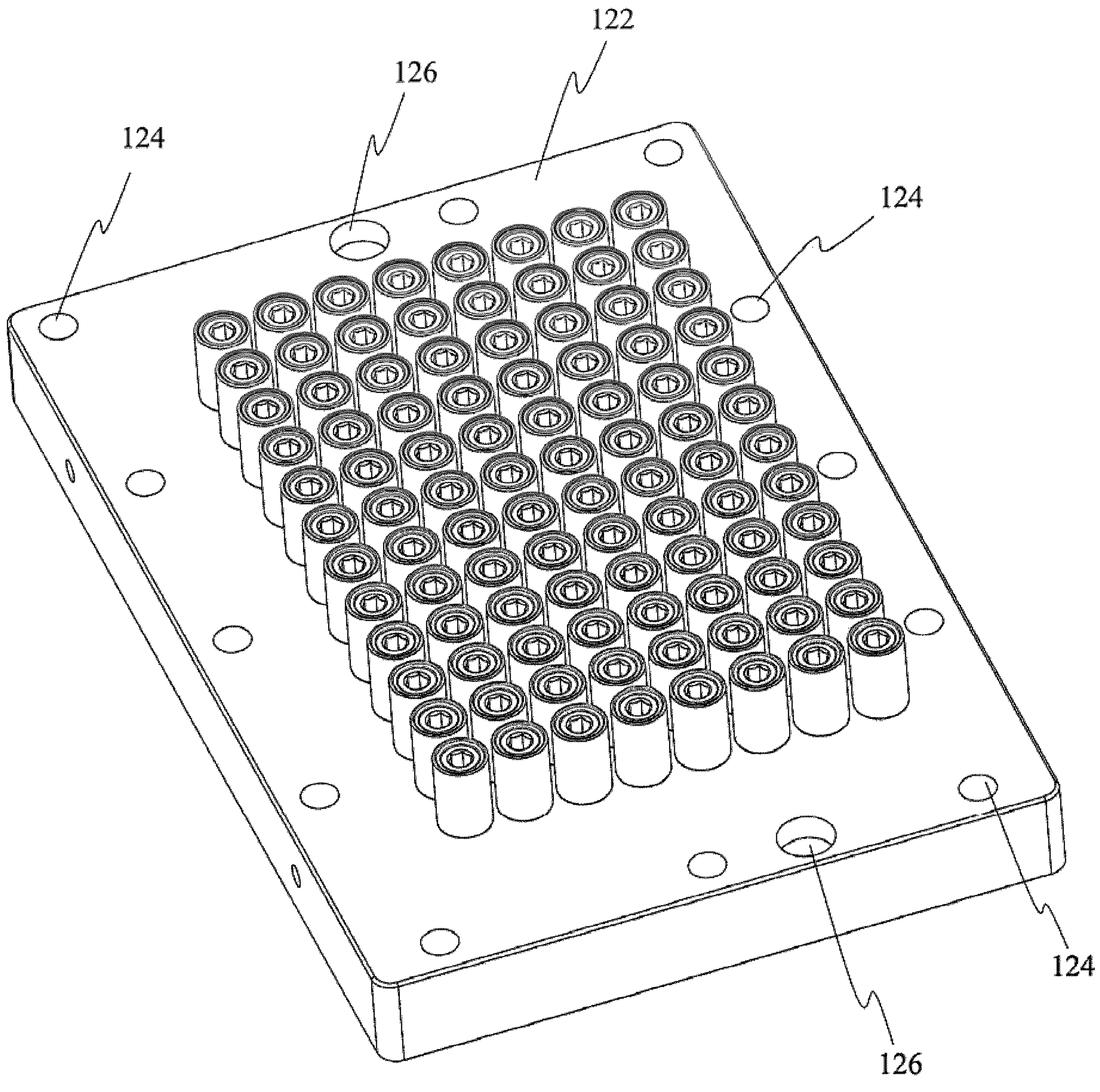
FIGS. 6*a* and 6*b* illustrate a flow control unit in perspective view (FIG. 6*a*) and cross-sectional view (FIG. 6*b*).
Figure 6B:
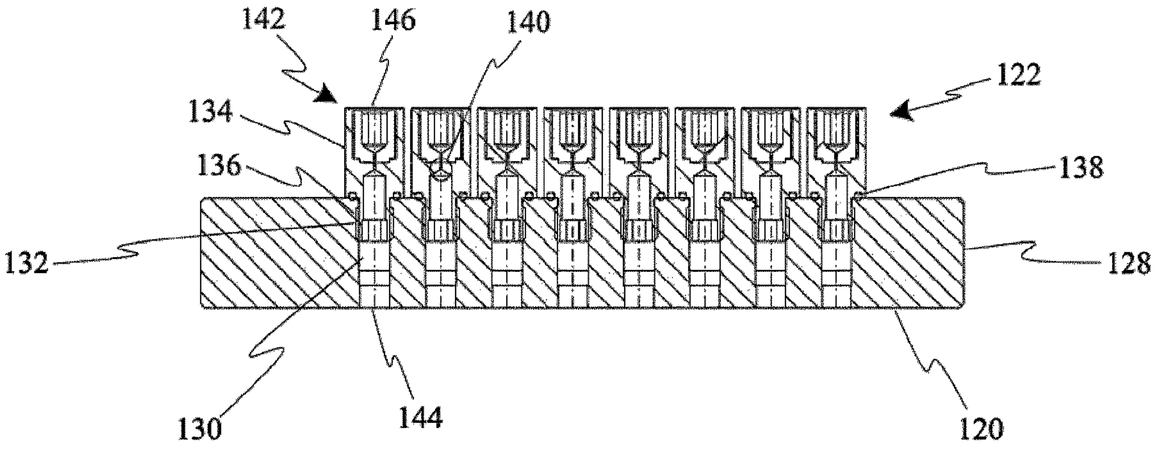

FIGS. 6*a* and 6*b* illustrate a flow control unit 6. FIG. 6*a* shows a perspective view, FIG. 6*b* shows a cross-sectional view of the flow control unit 6.

The flow control unit 6 comprises a first connecting surface 120 and a second connecting surface 122.

The flow control unit 6 comprises bores 124 that are used for connecting with other units (e.g. filter unit 6 and/or fluid discharge unit 4). The bores 124 may be provided with internal threads in order to receive an external thread, or have a smooth interior wall to receive e.g. a bolt or pin.

Furthermore, bores 126 may be present for supporting a general alignment of the flow control unit 6 relative to the units arranged above and/or below in the illustration. For example, the bores 126 may serve to receive pins that extend from a unit arranged below in the illustration, which enables an at least general alignment of the units in relation to each other.

The flow control unit 6 comprises through-holes 130. The through-holes 130 extend between the first connecting surface 120 and the second connecting surface 122. The openings 144 of the through-holes 130 on the first connecting surface 120 are referred to as inlets. The openings 146 of the through-holes 130 on the second connecting surface 122 are referred to as outlets.

The flow control unit 4 may comprise what is known as critical nozzles.

A critical nozzle ensures a substantially constant flow that is determined by the pressure on the input or output side. In contrast to a vacuum valve, for example, which can adjust itself, a critical nozzle may be considered as a structural flow restrictor that ensures always the same conditions.

The embodiment of the flow control unit 4 shown comprises a base plate 128 through which the through-holes 130 extend. In the upper region of the through-holes 130 in the illustration, these are each provided with an internal thread 132.

Furthermore, nozzle inserts 134 are provided which have an external thread 136 in the lower region in the illustration. The nozzle inserts 134 are each screwed into one of the through-holes 130 by means of the external threads 136. Sealings 138 (e.g. o-rings) may be provided between the nozzle inserts 134 and the base plate 128.

The structures forming critical nozzles as such (reference numeral 140) are formed in the nozzle inserts 134.

The first connecting surface 120 of the flow control unit 4, comparable to the above-mentioned first connecting surfaces in their embodiments shown, provide a substantially flat plane.

In the variant shown, the second connecting surface 122 of the flow control unit 4 is provided by the free ends 142 of the nozzle inserts 134. According to the illustration, the second connecting surface comprises several partial surfaces, i.e. the ones that are provided by each of the free ends 142.

Figure 6C:
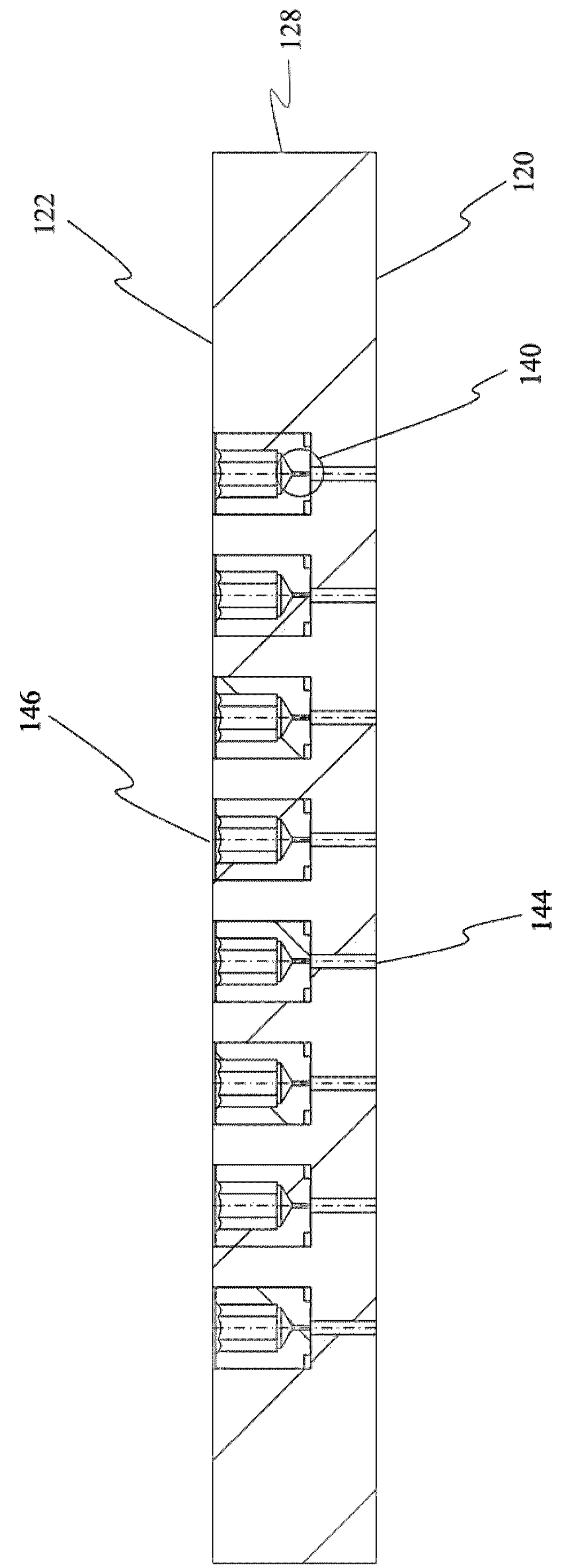
FIG. 6*c* illustrates another nozzle unit in cross-section.

A further embodiment of the flow control unit 4 is illustrated in FIG. 6*c*. In such variants, the critical nozzles 140 are arranged and/or formed in a base plate 128 itself. In such variants, the second connecting surface 122 can be provided by what is the upper side of the base plate 128 in the illustration. Then, the second connecting surface 122 of the flow control unit 4, comparable to the above-mentioned first connecting surfaces in their embodiments shown, may provide a substantially flat plane.

In any event, the inlets 144 are provided on the first connecting surface 120, and the outlets 146 are provided on the second connecting surface.

In further embodiments, the flow control unit 4 may comprise vacuum nozzles or other means, each disposed between an inlet 144 and an outlet 146 and adapted to limit the fluid flow.

The flow control unit 6 may include handles that may be helpful in its handling.

Figure 7:
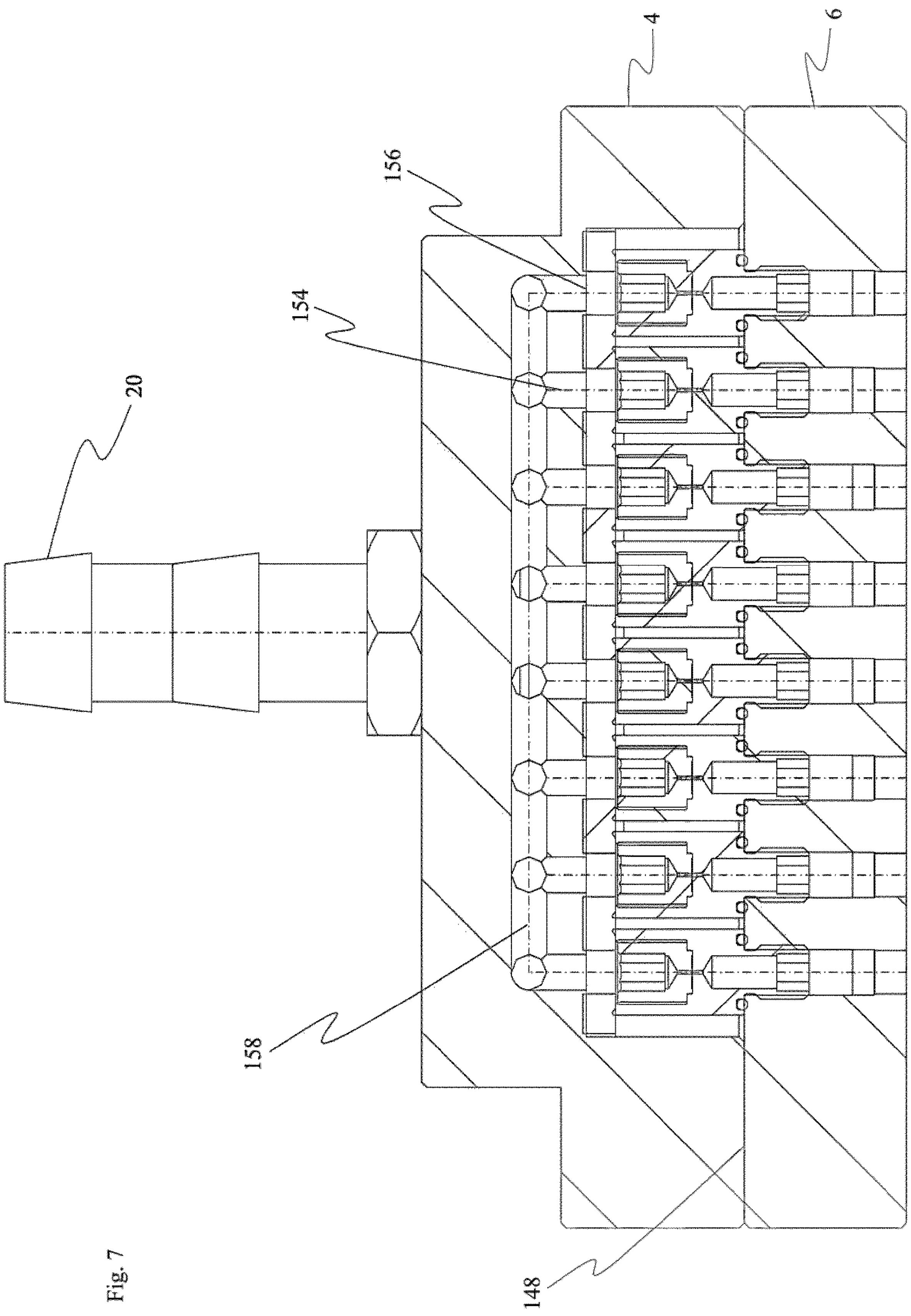
FIG. 7 illustrates a fluid discharge unit.

FIG. 7 illustrates a fluid discharge unit 4.

The fluid discharge unit 4 includes a first connecting surface 148.

The fluid discharge unit 4 comprises bores 150 that are used for connecting with other units (e.g. flow control unit 6). The bores 150 may be provided with internal threads in order to receive an external thread, or have a smooth interior wall to receive e.g. a bolt or pin.

Furthermore, bores 152 may be present for supporting a general alignment of the fluid discharge unit 4 relative to the units which in the illustration are arranged above it. For example, the bores 152 may serve to receive pins that extend from a unit arranged below in the illustration, which enables an at least general alignment of the units in relation to each other.

The fluid discharge unit 4 comprises bores 154 comprising an inlet 156 at their respective first connecting surface 148, and the inner end of which is in fluid communication with an internal channel 158.

The internal channels 148 extend like a grid inside the fluid discharge unit 4 and establish fluid connections of the inlets 156 with the output-side port 20 of the fluid discharge unit 4. A connection (e.g. hose) to a negative pressure source and/or a fluid sink can be connected to the output-side port 20 of the fluid discharge unit 4.

Figure 8:
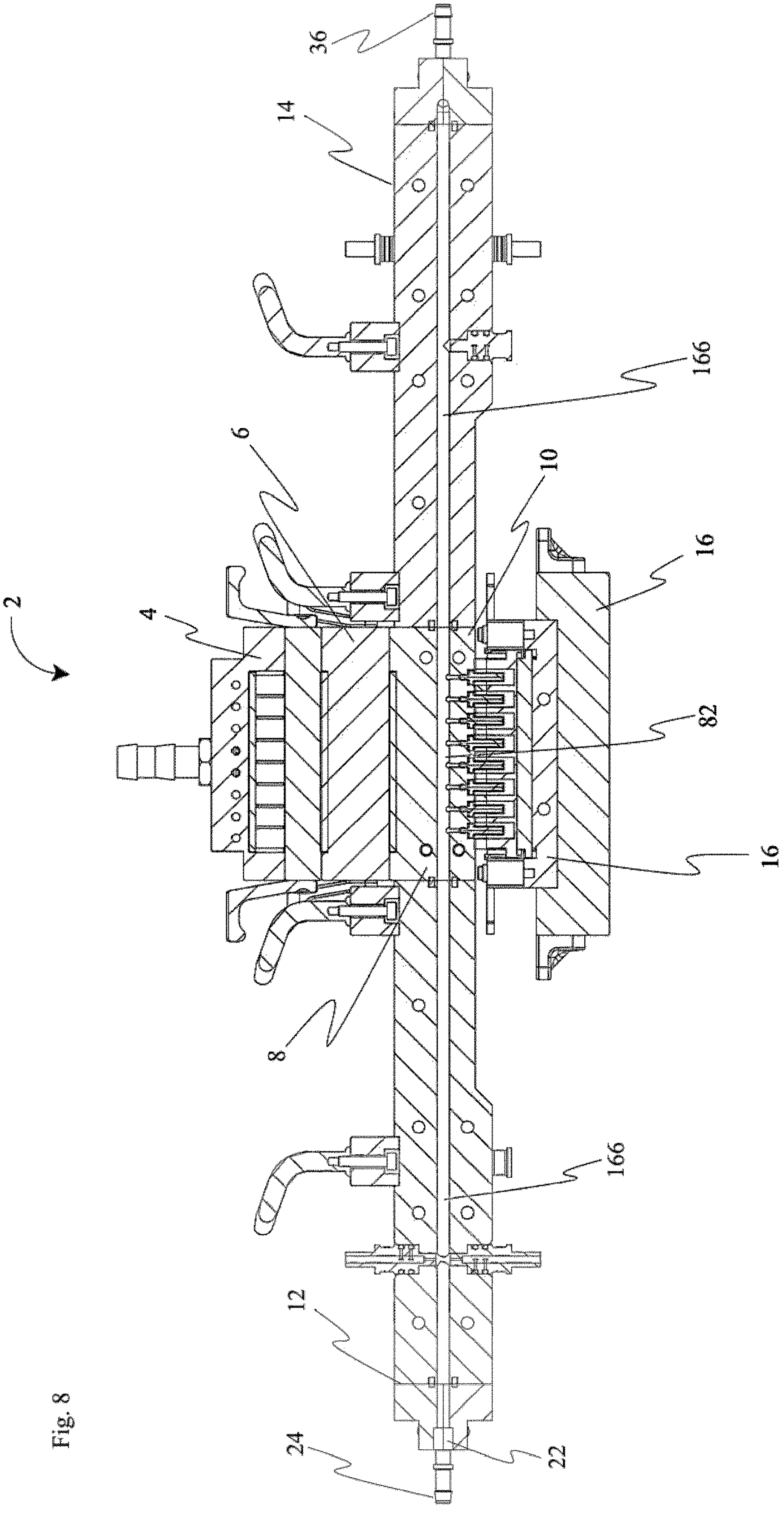
FIG. 8 illustrates gassing fluid supply units.
Figure 9:
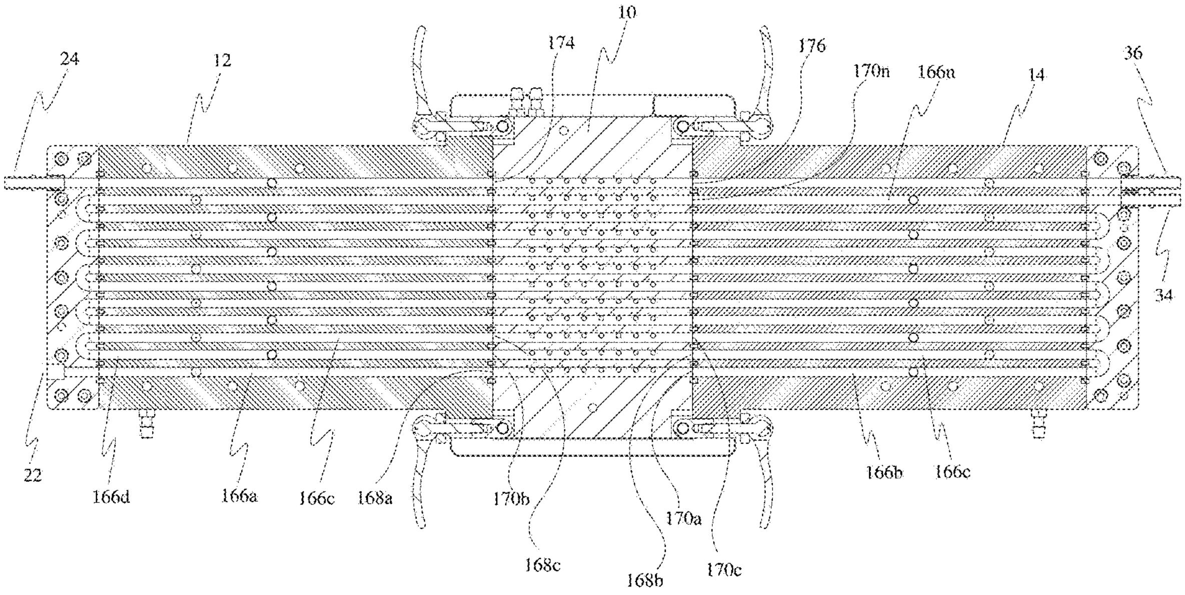
FIG. 9 illustrates an embodiment of supplying test fluid to an exposition head unit.

FIG. 8 shows gassing fluid supply units 12 and 14, and FIG. 9 illustrates an embodiment of supplying test fluid to the exposition head unit 10.

The gassing fluid supply unit 12 may be connected to a test fluid source by means of its test fluid supply port 22. A test fluid guideway 166*a* extends from the test fluid supply port 22 up to a test fluid outlet 168*a*. The test fluid outlet 168*a* is in operative connection with a corresponding test fluid inlet 82, so that test fluid can be carried into the corresponding fluid guideway 84 of the exposition head unit 10. Test fluid that is supplied to this fluid guideway 84, but is in excess, leaves the exposition head unit 10 at the test fluid outlet of the fluid guideway 84. The gassing fluid outlet of the fluid guideway 84 is in fluid communication with a test fluid inlet 170*a* of a fluid guideway 166*b* of the gassing fluid supply unit 14. From the test fluid inlet 170*a*, test fluid is carried through the fluid guideway 166*b* into a connected fluid guideway 166*c*. From a test fluid outlet 168*b* of the fluid guideway 166*c*, the test fluid enters the exposition head unit 10. The test fluid outlet 168*b* is in operative connection with a further corresponding test fluid inlet 82, so that test fluid can be carried into the further corresponding fluid guideway 84 of the exposition head unit 10. Test fluid that is supplied to this further fluid guideway 84, but is in excess, leaves the exposition head unit 10 at the test fluid outlet of the fluid guideway. The test fluid outlet of the further fluid guideway is in fluid communication with a gassing fluid inlet 170*b* of a fluid guideway 166*d* of the gassing fluid supply unit 12. From the test fluid inlet 170*b*, test fluid is carried through the fluid guideway 166*d* into a connected fluid guideway 166*e*. From a test fluid outlet 168*c* of the fluid guideway 166*e*, the test fluid again enters the exposition head unit 10. This procedure is carried out for all fluid guideways of the exposition head unit 10. Finally, the remaining test fluid is carried via a test fluid inlet 170*n* of a fluid guideway 166*n* of the gassing fluid supply unit 14 to its test fluid discharge port 34. From the test fluid discharge port 34, the remaining test fluid can be transported to a sink.

The mode of operation of the gassing device 2 is as follows. The starting point is the state in which all units involved are in operative connection with each other, and samples to be exposed to gas are arranged in the sample containers 50. Gassing fluid is supplied to the gassing fluid supply unit 12, and from there, it is routed to the exposition head unit 10, or is routed via the gassing fluid supply unit 12 to the exposition head unit 10, respectively. When negative pressure is applied to the output-side port 20 of the fluid discharge unit 4, it acts via the nozzle unit and the filter unit on the inlets 90 of the exposition head unit 10. As a result, negative pressure is also applied to the gassing fluid discharge outlets 94 of the exposition head unit 10. This way, gassing fluid is transported from the respective fluid guideways 84 via the respective gassing fluid discharge outlets 94 into the sample containers 50, where the samples therein are exposed to the gas.

Gassing with a reference fluid can also be provided. A reference fluid is a fluid the effect of which when exposing samples to gas is compared with the effect when exposing samples to test fluid. For this purpose, the gassing fluid supply unit 12 may include a reference fluid supply port 24 for connection with a reference fluid source, and the gassing fluid supply unit 14 may include a reference fluid discharge port 36 for connection with a reference fluid sink. Reference fluid supplied to the gassing fluid supply unit 12 via the reference fluid supply port 24 reaches a reference fluid outlet 174 via a reference fluid guideway 172*a*. From there, the reference fluid is supplied to a fluid guideway 84 of the exposition head unit 10, wherein excess reference fluid goes from there to a reference fluid inlet 176 of the gassing fluid supply unit 14. Excess reference fluid is taken to the reference fluid discharge port 36 via a reference fluid guideway 172*b*, and from there to a reference fluid sink.

Figure 10:
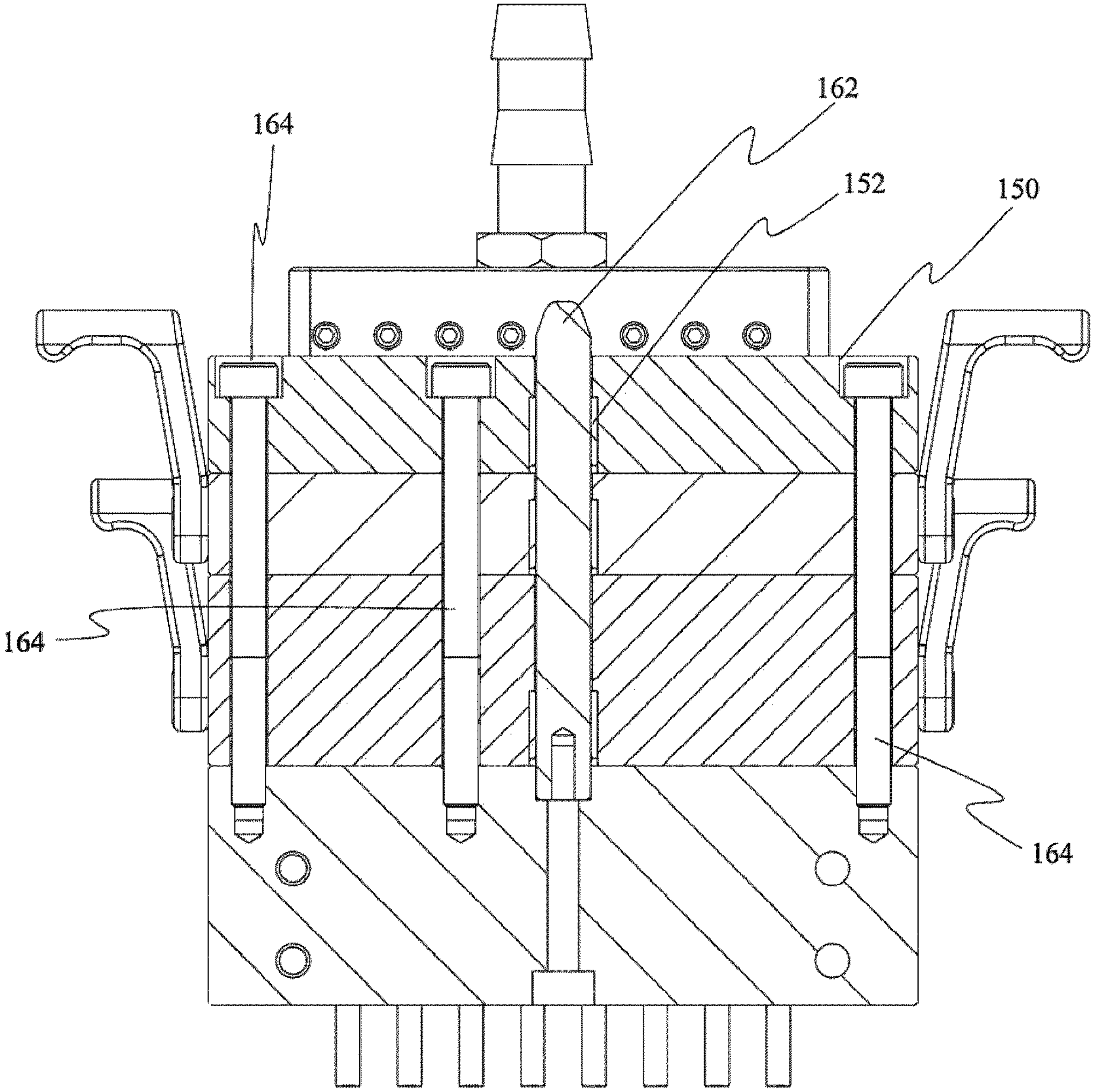
FIG. 10 illustrates a partial view of a fluid discharge unit, flow control unit, filter unit and exposition head unit arranged in operative connection with each other.

FIG. 10 illustrates how the fluid discharge unit, flow control unit, filter unit and exposition head unit can be arranged in operative connection with each other.

Using one or more guiding pins 162 which extend from the guiding bores 80 of the exposition head unit 10, the filter unit 8, the flow control unit 6 and the fluid discharge unit 4 can be arranged consecutively on top of one another. The guiding pins 162 extend through the guiding bores 104, 126 and 152.

Screws 164 that are inserted from the top through the connecting bores 150 and then through the connecting bores 124, 102 and 78 are screwed into the internal threads of the connecting bores 78 of the exposition head unit. This way, the connecting surfaces of the fluid discharge unit, flow control unit, filter unit and exposition head unit are brought into operative connection.

FIG. 11 illustrates the fluid connections between inlets of the first connecting surfaces and outlets of the second connecting surfaces that function without using any further components.

Thus, the outlets 92 of the exposition head unit 10 and the inlets 108 of the filter unit 8 are disposed directly opposite each other. Due to the operative connection of the second connecting surface 76 of the exposition head unit 10 and the first connecting surface 98 of the filter unit 8, there is a fluid connection between each of the outlets 92 of the exposition head unit 10 and the inlets 108 of the filter unit 8, which is isolated outwardly and functions without using any further components. This also applies when using the sealing mat 96, because the latter forms part of the exposition head unit 10, or is to be allocated to its second connecting surface 76, respectively.

The outlets 110 of the filter unit 8 and the inlets 144 of the flow control unit 6 are disposed directly opposite each other. Due to the operative connection of the second connecting surface 100 of the filter unit 8 and the first connecting surface 120 of the flow control unit 6, there is a fluid connection between each of the outlets 110 of the filter unit 8 and the inlets 144 of the flow control unit 6, which is isolated outwardly and functions without using any further components. This also applies when using the sealing mat 116, because the latter forms part of the filter unit 10, or is associated with its second connecting surface 100, respectively.

Furthermore, the outlets 146 of the filter unit 6 and the inlets 156 of the fluid discharge unit 4 are disposed directly opposite each other. Due to the operative connection of the second connecting surface 122 of the flow control unit 6 and the first connecting surface 148 of the fluid discharge unit 4, there is a fluid connection between each of the outlets 146 of the flow control unit 6 and the inlets 156 of the fluid discharge unit 4, which is isolated outwardly and functions without using any further components. This also applies when using a sealing mat on the second connecting surface 122 of the flow control unit 6 and/or the first connecting surface 148 of the fluid discharge unit 4, because these are to be allocated to the respective connecting surface.

The gassing fluid supply units 12 and 14 may also be connected with the exposition head unit 10 in such a way that a fluid connection is established between the outlets and inlets of the respective gassing fluid supply unit and the corresponding inlets and outlets of the exposition head unit 10, which is isolated outwardly and functions without using any further components.

To achieve this, the gassing fluid supply units 12 and 14, and the exposition head unit 10 may e.g. be braced against each other by means of a lever mechanism 178 that can engage with one of the connecting structures 82 of the exposition head unit 10 (see FIG. 1).

Figure 12:
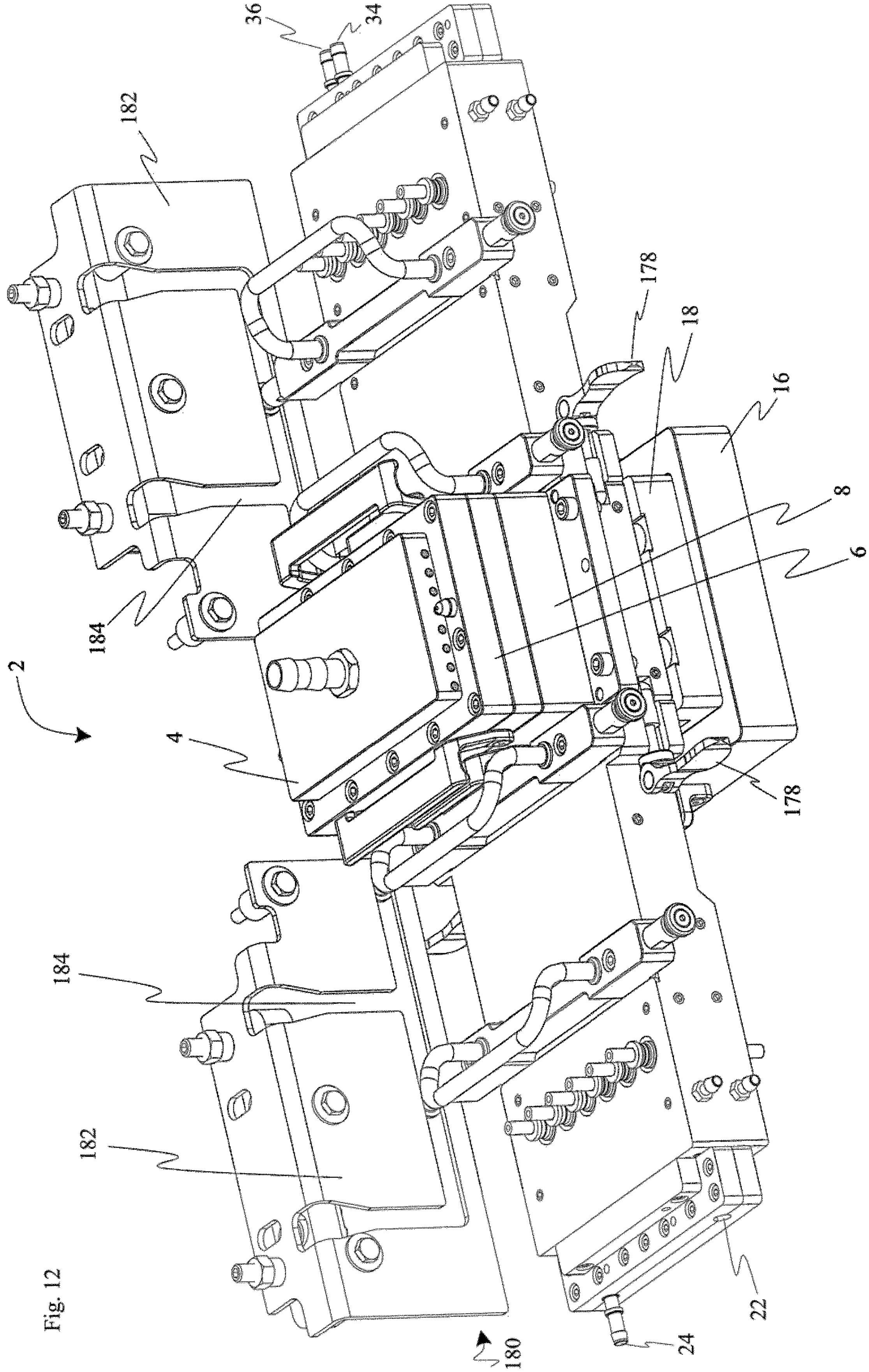
FIG. 12 illustrates a gassing device including a mounting system.

FIG. 12 illustrates a gassing device including a mounting system 180. As shown, it is provided that of the units 4-10, "only" the exposition head unit 10 is (releasably) mounted on the mounting system (180), and to then attach the units 4-8 to the exposition head unit 10. This also applies to the sample container unit receiving unit 16 when used without the sample container unit receiving unit positioning device 62.

If a sample container unit receiving unit positioning device 62 is used, it is furthermore provided to arrange the sample container unit receiving unit positioning device 62 on the mounting system 180.

Furthermore, the mounting system 180 may comprise a gassing fluid supply unit positioning device 182 for each of the gassing fluid supply units 12 and 14, for positioning the respective gassing fluid supply unit in a first position in which the first gassing fluid supply unit and the exposition head unit are spaced away from one another, and in a second position in which the gassing fluid supply unit and the exposition head unit are in operative connection. To achieve this, the gassing fluid supply unit positioning device 182 may e.g. comprise first guideways 184 that allow movement of a gassing fluid supply unit toward the exposition head unit 10 and away from it.

In further variants, it is provided that at least one of the gassing fluid supply unit positioning devices comprises at least one controlled actuation device for positioning and/or moving the corresponding gassing fluid supply unit in at least partly automated fashion.

Electric motors, actuators (e.g. hydraulic and/or pneumatic actuators), toothed belts, cogs, traction ropes etc. can be used as actuation devices.

For example, the function of the setting wheel and/or the function of the mechanism allowing movements in the directions indicated by the arrow 72 may be taken over by at least one controlled actuation device.

| List of reference numerals | |
|---|---|
| Gassing device | 2 |
| Fluid discharge unit | 4 |
| Flow control unit | 6 |
| Filter unit | 8 |
| Exposition head unit | 10 |
| Gassing fluid supply unit | 12 |
| Gassing fluid supply unit | 14 |
| Sample container unit receiving unit | 16 |
| Sample container unit | 18 |
| Output-side port of the fluid discharge unit | 20 |
| Test fluid supply port for a test fluid source | 22 |
| Reference fluid supply port for a reference fluid source | 24 |
| Dilution fluid input of the gassing fluid supply unit 12 | 26 |
| Dilution fluid output of the gassing fluid supply unit 12 | 28 |
| Tempering fluid inlet of the gassing fluid supply unit 12 | 30 |
| Tempering fluid outlet of the gassing fluid supply unit 12 | 32 |
| Test fluid discharge port | 34 |
| Reference fluid discharge port | 36 |
| Dilution fluid input of the gassing fluid supply unit 14 | 38 |
| Dilution fluid output of the gassing fluid supply unit 14 | 40 |
| Tempering fluid inlet of the gassing fluid supply unit 12 | 42 |
| Tempering fluid outlet of the gassing fluid supply unit 12 | 44 |
| Tempering fluid inlet of the exposition head unit | 46 |

-continued

| List of reference numerals | |
|---|---|
| Tempering fluid outlet of the exposition head unit | 48 |
| Sample container | 50 |
| Frame of the sample container unit receiving unit | 52 |
| Base of the sample container unit receiving unit | 54 |
| Jaws for securing/positioning the sample container unit | 56 |
| Lever for shifting the jaws | 58 |
| Handle of the sample container unit receiving unit | 60 |
| Sample container unit receiving unit positioning device | 62 |
| Mounting surface of the sample container unit receiving unit positioning device | 64 |
| Base of the sample container unit receiving unit positioning device | 66 |
| Setting wheel | 68 |
| "Up" and "down" movement of the base | 70 |
| "Forward" and "rearward" movement of the base | 72 |
| First connecting surface of the exposition head unit | 74 |
| Second connecting surface of the exposition head unit | 76 |
| Connecting bores of the exposition head unit for (mechanical) connection with another unit | 78 |
| Guiding bores of the exposition head unit for aligning the same relative to other units | 80 |
| Connecting structures of the exposition head unit | 82 |
| Fluid guideways of the exposition head unit | 84 |
| Openings of the gassing fluid guideways of the exposition head unit | 86; 86a, 86b, 86c, . . . , 86n |
| Gassing fluid feedthroughs | 88 |
| Inlet of a gassing fluid feedthrough of the exposition head unit | 90 |
| Outlet of a gassing fluid feedthrough of the exposition head unit | 92 |
| Gassing fluid discharge outlet | 94 |
| Sealing mat of the exposition head unit | 96 |
| First connecting surface of the filter unit | 98 |
| Second connecting surface of the filter unit | 100 |
| Connecting bores of the filter unit for (mechanical) connection with another unit | 102 |
| Guiding bores of the filter unit for aligning the same relative to other units | 104 |
| Through-holes of the filter unit | 106 |
| Inlet of a through-hole of the filter unit | 108 |
| Outlet of a through-hole of the filter unit | 110 |
| Coarse filter | 112 |
| Fine filter | 114 |
| Sealing mat of the filter unit | 116 |
| Handles of the filter unit | 118 |
| First connecting surface of the flow control unit | 120 |
| Second connecting surface of the flow control unit | 122 |
| Connecting bores of the flow control unit for (mechanical) connection with another unit | 124 |
| Guiding bores of the flow control unit for aligning the same relative to other units | 126 |
| Base plate of the flow control unit | 128 |
| Through-holes of the flow control unit | 130 |
| Internal thread of the through-holes of the flow control unit | 132 |
| Nozzle inserts | 134 |
| External thread of the nozzle inserts | 136 |
| Sealing between nozzle insert and base plate | 138 |
| Critical nozzle | 140 |
| Free end of a nozzle insert | 142 |
| Inlet of a through-hole of the flow control unit | 144 |
| Outlet of a through-hole of the flow control unit | 146 |
| First connecting surface of the fluid discharge unit | 148 |
| Connecting bore of the fluid discharge unit for (mechanical) connection with another unit | 150 |
| Guiding bore of the fluid discharge unit for aligning the same relative to other units | 152 |
| Inlet bore of the fluid discharge unit | 154 |
| Inlet of an inlet bore of the fluid discharge unit | 156 |
| Internal channel of the fluid discharge unit | 158 |
| FREE | 160 |
| Guiding pin | 162 |
| Screw for arranging the fluid discharge unit, flow control unit, filter unit and exposition head unit in operative connection with each other. | 164 |
| Test fluid guideway of a gassing fluid supply unit | 166 |

-continued

| List of reference numerals | |
|---|---|
| Test fluid outlet of a gassing fluid supply unit | 168 |
| Test fluid inlet of a gassing fluid supply unit | 170 |
| Reference fluid guideway of a gassing fluid supply unit | 172 |
| Reference fluid outlet of a gassing fluid supply unit | 174 |
| Reference fluid inlet of a gassing fluid supply unit | 176 |
| Lever mechanism for connecting gassing fluid supply unit and exposition head unit | 178 |
| Mounting system | 180 |
| Gassing fluid supply unit positioning device | 182 |
| First guideway of a gassing fluid supply unit positioning device | 184 |

What is claimed is:

1. A gassing device comprising:

a fluid discharge unit with inlets arranged at a first connecting surface, and an output-side port arranged at a surface opposite the first connecting surface, provided for connecting with a negative pressure source;

a flow control unit comprising inlets arranged at a first connecting surface of the flow control unit, and outlets arranged at a second connecting surface of the flow control unit, and comprising fluid flow devices capable of defining a fluid flow between the inlets and corresponding outlets, that are arranged between each one of the inlets at the first connecting surface of the flow control unit and a corresponding one of outlets at the second connecting surface of the flow control unit, an exposition head unit comprising test fluid inlets and gassing fluid discharge outlets that are each in fluid communication with each other, inlets arranged at a first connecting surface of the exposition head unit, and outlets arranged at a second connecting surface of the exposition head unit, and gassing fluid feedthroughs, each arranged between the inlets arranged at the first connecting surface of the exposition head unit, and a corresponding one of the outlets arranged at the second connecting surface of the exposition head unit, wherein the inlets at the first connecting surface of the exposition head unit are each associated with one of the gassing fluid discharge outlets, a sample container unit receiving unit connectable to the exposition head unit for arranging a sample container unit comprising sample containers, wherein the fluid discharge unit and the flow control unit are connected in such a manner that the first connecting surface of the fluid discharge unit and the second connecting surface of the flow control unit are in operative connection with each other, so that the inlets of the fluid discharge unit and the outlets of the flow control unit are in operative connection with each other closed off to the outside, without using any further components, when the exposition head unit and the sample container unit receiving unit are connected with each other, the first connecting surface of the exposition head unit and the second connecting surface of the sample container unit receiving unit are in operative connection such that the gassing fluid discharge outlets of the exposition head unit and a corresponding, associated one of the inlets at the first connecting surface of the exposition head unit and a corresponding one of the sample containers of a sample container unit received by the sample container unit receiving unit, are in fluid communication without using any further components.

2. The gassing device according to claim 1, wherein the output-side port of the fluid discharge unit is adapted for connecting with a fluid sink.

3. The gassing device according to claim 1, wherein the fluid flow device of the flow control unit comprises at least i) a critical nozzle, and/or ii) a vacuum nozzle.

4. The gassing device according to claim 1, further comprising:

a filter unit comprising inlets arranged at a first connecting surface of the filter unit, and outlets arranged at a second connecting surface of the filter unit, and a filter each arranged between the inlets and outlets, wherein the flow control unit, the filter control unit and the filter unit are connected in such a manner that the first connecting surface of the flow control unit and the second connecting surface of the filter unit are in operative connection, so that the inlets of the flow control unit and the outlets of the filter unit are in operative connection with each other closed off to the outside, without using any further components.

5. The gassing device according to claim 4, wherein the filter unit and the exposition head unit are connected in such a manner that the first connecting surface of the filter unit and the second connecting surface of the exposition head unit are in operative connection, so that the inlets of the filter unit and the outlets of the exposition head unit are in operative connection with each other closed off to the outside, without using any further components.

6. The gassing device according to claim 1, further comprising:

a first gassing fluid supply unit, wherein the first gassing fluid supply unit comprises gassing fluid outlets on a first side, and at least one gassing fluid supply port on a second side, wherein the at least one gassing fluid outlet of the first gassing fluid supply unit is associated with one of the gassing fluid inlets of the exposition head unit arranged on a first side of the exposition head unit, wherein the first gassing fluid supply unit comprises gassing fluid inlets on its first side, the exposition head unit comprises gassing fluid outlets on the first side, wherein the gassing fluid inlets of the first gassing fluid supply unit are each assigned to one of the gassing fluid outlets on the first side of the exposition head unit.

7. The gassing device according to claim 1, further comprising:

a mounting system on which the exposition head unit is releasably mounted, wherein the fluid discharge unit and the flow control unit are not releasably mounted on the mounting system but on the exposition head unit.

8. The gassing device according to claim 1, further comprising:

a sample container unit receiving unit positioning device adapted to position the sample container unit receiving unit in a position in which the sample container unit receiving unit and the exposition head unit are in operative connection, and in a position that permits access to a sample container unit received by the sample container unit receiving unit.

9. The gassing device according to claim 1, further comprising:

at least one gassing fluid outlet on the first side of the exposition head unit, the at least one gassing fluid outlet of the first gassing fluid supply unit is a first gassing fluid outlet of the first gassing fluid supply unit that is in fluid communication with the gassing fluid supply port of the first gassing fluid supply unit, in at least one case, a further gassing fluid outlet and an adjacent gassing fluid inlet of the first gassing fluid supply unit is in fluid communication via a gassing fluid guideway formed in the first gassing fluid supply unit.

10. The gassing device of claim 4, further comprising:

a mounting system on which the exposition head unit is releasably mounted; and wherein the filter unit is not releasably mounted on the mounting system but on the exposition head unit.

11. The gassing device according to claim 1, wherein one of the gassing fluid outlets of the first gassing fluid supply unit is in fluid communication with the gassing fluid supply port of the first gassing fluid supply unit, adjacent gassing fluid outlets and gassing fluid inlets of the first gassing fluid supply unit are each in fluid communication via a gassing fluid guideway formed in the first gassing fluid supply unit.

12. The gassing device according to claim 1, wherein the flow control unit and the exposition head unit are connected in such a manner that the first connecting surface of the flow control unit and the second connecting surface of the exposition head unit are in operative connection, so that the inlets of the flow control unit and the outlets of the exposition head unit are in operative connection with each other closed off to the outside, without using any further components.

* * * * *